United States Patent
Abotabl et al.

(10) Patent No.: US 11,706,780 B2
(45) Date of Patent: Jul. 18, 2023

(54) COMMON DOWNLINK AND UPLINK SEMI-PERSISTENT RESOURCE CONFIGURATION FOR FULL DUPLEX

(71) Applicant: QUALCOMM Incorporated, San Diego, CA (US)

(72) Inventors: Ahmed Attia Abotabl, San Diego, CA (US); Ahmed Elshafie, San Diego, CA (US); Abdelrahman Mohamed Ahmed Mohamed Ibrahim, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 17/370,834

(22) Filed: Jul. 8, 2021

(65) Prior Publication Data
US 2023/0010371 A1 Jan. 12, 2023

(51) Int. Cl.
*H04W 72/00* (2023.01)
*H04W 72/23* (2023.01)
(Continued)

(52) U.S. Cl.
CPC .............. *H04W 72/23* (2023.01); *H04L 5/14* (2013.01); *H04W 72/1268* (2013.01); *H04W 72/1273* (2013.01)

(58) Field of Classification Search
CPC .............. H04W 72/23; H04W 72/1268; H04W 72/1273; H04L 5/14
(Continued)

(56) References Cited

U.S. PATENT DOCUMENTS

2017/0303302 A1    10/2017  Bagheri et al.
2019/0037555 A1*    1/2019  Kim ..................... H04W 72/23
(Continued)

FOREIGN PATENT DOCUMENTS

WO    WO-2017164900 A1    9/2017

OTHER PUBLICATIONS

International Search Report and Written Opinion—PCT/US2022/034026—ISA/EPO—dated Sep. 9, 2022 (2103773WO).

*Primary Examiner* — Obaidul Huq
(74) *Attorney, Agent, or Firm* — Holland & Hart LLP

(57) ABSTRACT

Methods, systems, and devices for wireless communications are described. A user equipment (UE) may receive one or more messages indicative of uplink semi-persistent scheduling (SPS) resources and downlink SPS resources allocated to the UE, the uplink SPS resources and the downlink SPS resources being within a frequency band used for full duplex communications by the UE. The UE may modify parameters associated with the full duplex communications on the uplink SPS resources, the downlink SPS resources, or both, based at least in part on instances of the uplink SPS resources at least partially overlapping in time with instances of the downlink SPS resources. The UE may apply the one or more parameters, after modification, to transmission of uplink communications over the instances of the uplink SPS resources, reception of downlink communications over the instances of the downlink SPS resources, or both.

30 Claims, 17 Drawing Sheets

(51) Int. Cl.
*H04L 5/14* (2006.01)
*H04W 72/1268* (2023.01)
*H04W 72/1273* (2023.01)

(58) Field of Classification Search
USPC .................................................. 370/276, 277
See application file for complete search history.

(56) References Cited

U.S. PATENT DOCUMENTS

2021/0377793 A1* 12/2021 Moilanen .................. H04L 1/08
2022/0183040 A1*  6/2022 Dudda .................. H04L 1/1812

\* cited by examiner

COMMON DOWNLINK AND UPLINK SEMI-PERSISTENT RESOURCE CONFIGURATION FOR FULL DUPLEX

FIELD OF TECHNOLOGY

The following relates to wireless communications, including common downlink and uplink semi-persistent resource configuration for full duplex.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support common downlink and uplink semi-persistent resource configuration for full duplex. Generally, the described techniques provide for a user equipment (UE) to modify configured grant (CG) (e.g., uplink semi-persistent scheduling (SPS)) resources or configurations and/or downlink SPS resources or configurations in cases where the allocated resources overlap in the time domain (during full duplex communications, for example). For example, the UE may be separately or commonly configured with both SPS and CG resources to use for full duplex communications. The UE may identify or otherwise determine that instances of downlink communications using the SPS resources overlap in the time domain with instances of uplink communications using the CG resources. Accordingly, the UE may modify parameters of the SPS and/or CG resources (e.g., to mitigate or eliminate self-interference). Selecting which configuration to modify may be based on the priority level of each instance or configuration. The modifications to the parameters may include, but are not limited to, updates to the modulation and coding scheme (MCS), rank, transmit power level, frequency hopping pattern, periodicity, precoders, etc., for the corresponding uplink and/or downlink communications. The modifications may include dropping one of the communications based on the overlap, in some examples. Accordingly, the UE may apply the modified parameters when performing the uplink and downlink communications (e.g., full duplex communications) using the corresponding CG and SPS resources.

A method for wireless communication at a UE is described. The method may include receiving one or more messages indicative of uplink SPS resources allocated to the UE and downlink SPS resources allocated to the UE, the uplink SPS resources and the downlink SPS resources being within a frequency band used for full duplex communications by the UE, modifying one or more parameters associated with the full duplex communications on the uplink resources, the downlink SPS resources, or both, based on one or more instances of the uplink SPS resources at least partially overlapping in time with one or more instances of the downlink SPS resources, and applying the one or more parameters, after modification, to transmission of uplink communications over the one or more instances of the uplink SPS resources, reception of downlink communications over the one or more instances of the downlink SPS resources, or both.

An apparatus for wireless communication at a UE is described. The apparatus may include a processor, memory coupled with the processor, and instructions stored in the memory. The instructions may be executable by the processor to cause the apparatus to receive one or more messages indicative of uplink SPS resources allocated to the UE and downlink SPS resources allocated to the UE, the uplink SPS resources and the downlink SPS resources being within a frequency band used for full duplex communications by the UE, modify one or more parameters associated with the full duplex communications on the uplink resources, the downlink SPS resources, or both, based on one or more instances of the uplink SPS resources at least partially overlapping in time with one or more instances of the downlink SPS resources, and apply the one or more parameters, after modification, to transmission of uplink communications over the one or more instances of the uplink SPS resources, reception of downlink communications over the one or more instances of the downlink SPS resources, or both.

Another apparatus for wireless communication at a UE is described. The apparatus may include means for receiving one or more messages indicative of uplink SPS resources allocated to the UE and downlink SPS resources allocated to the UE, the uplink SPS resources and the downlink SPS resources being within a frequency band used for full duplex communications by the UE, means for modifying one or more parameters associated with the full duplex communications on the uplink resources, the downlink SPS resources, or both, based on one or more instances of the uplink SPS resources at least partially overlapping in time with one or more instances of the downlink SPS resources, and means for applying the one or more parameters, after modification, to transmission of uplink communications over the one or more instances of the uplink SPS resources, reception of downlink communications over the one or more instances of the downlink SPS resources, or both.

A non-transitory computer-readable medium storing code for wireless communication at a UE is described. The code may include instructions executable by a processor to receive one or more messages indicative of uplink SPS resources allocated to the UE and downlink SPS resources allocated to the UE, the uplink SPS resources and the downlink SPS resources being within a frequency band used for full duplex communications by the UE, modify one or more parameters associated with the full duplex communications on the uplink resources, the downlink SPS resources, or both, based on one or more instances of the uplink SPS resources at least partially overlapping in time with one or more instances of the downlink SPS resources, and apply the one or more parameters, after modification, to transmission of uplink communications over the one or more instances of the uplink SPS resources, reception of downlink communications over the one or more instances of the downlink SPS resources, or both.

In some examples of the method, apparatuses, and non-transitory computer-readable medium described herein, modifying the one or more parameters may include operations, features, means, or instructions for determining a relative priority level between the one or more instances of the uplink SPS resources and the one or more instances of the downlink SPS resources and modifying the one or more parameters so as to prioritize either the transmission of the uplink communications over the one or more instances of the uplink SPS resources or the reception of the downlink communications over the one or more instances of the downlink SPS resources based on the relative priority level.

In some examples of the method, apparatuses, and non-transitory computer-readable medium described herein, modifying the one or more parameters may include operations, features, means, or instructions for modifying at least one of a modulation and coding scheme parameter or a rank parameter for either the transmission of the uplink communications over the one or more instances of the uplink SPS resources or the reception of the downlink communications over the one or more instances of the downlink SPS resources.

In some examples of the method, apparatuses, and non-transitory computer-readable medium described herein, modifying the one or more parameters may include operations, features, means, or instructions for modifying at least one of an uplink transmit power parameter, a frequency hopping parameter, or a precoder parameter for the transmission of the uplink communications over the one or more instances of the uplink SPS resources.

In some examples of the method, apparatuses, and non-transitory computer-readable medium described herein, applying the one or more parameters may include operations, features, means, or instructions for applying the one or more parameters, after modification, to communications during additional non-overlapping instances of the uplink SPS resources and the downlink SPS resources.

In some examples of the method, apparatuses, and non-transitory computer-readable medium described herein, applying the one or more parameters may include operations, features, means, or instructions for applying the one or more parameters, after modification, to communications during only the one or more instances of the uplink SPS resources and the one or more instances of the downlink SPS resources.

In some examples of the method, apparatuses, and non-transitory computer-readable medium described herein, receiving the one or more messages may include operations, features, means, or instructions for receiving a first message for the uplink SPS resources and a second message for the downlink SPS resources.

In some examples of the method, apparatuses, and non-transitory computer-readable medium described herein, receiving the one or more messages may include operations, features, means, or instructions for receiving a common message for the uplink SPS resources and the downlink SPS resources.

Some examples of the method, apparatuses, and non-transitory computer-readable medium described herein may further include operations, features, means, or instructions for determining, based on the common message, a downlink bandwidth part (BWP) identifier associated with the downlink SPS resources and determining an uplink BWP identifier associated with the uplink SPS resources based on the downlink BWP identifier.

Some examples of the method, apparatuses, and non-transitory computer-readable medium described herein may further include operations, features, means, or instructions for determining, based on the common message, an uplink BWP identifier associated with the uplink SPS resources and determining a downlink BWP identifier associated with the downlink SPS resources based on the uplink BWP identifier.

In some examples of the method, apparatuses, and non-transitory computer-readable medium described herein, receiving the common message may include operations, features, means, or instructions for receiving a common set of parameters for both the uplink SPS resources and the downlink SPS resources, separate sets of parameters for the uplink SPS resources and the downlink SPS resources, a first set of parameters for the downlink SPS resources with a first offset for determination of the uplink SPS resources, or a second set of parameters for the uplink SPS resources with a second offset for determination of the downlink SPS resources.

In some examples of the method, apparatuses, and non-transitory computer-readable medium described herein, the common set of parameters, the separate sets of parameters, the first set of parameters, and the second set of parameters each include one or more of time domain resource allocation parameters, frequency domain resource allocation parameters, modulation and coding scheme parameters, rank parameters, or periodicity parameters.

Some examples of the method, apparatuses, and non-transitory computer-readable medium described herein may further include operations, features, means, or instructions for identifying an activation status of the downlink SPS resources and the uplink SPS resources, where the activation status may be based on one of the downlink SPS resources being activated by the common message while the uplink SPS resources may be dynamically activated, the uplink SPS resources being activated by the common message while the downlink SPS resources may be dynamically activated, both the uplink SPS resources and the downlink SPS resources being activated by the common message, or both the uplink SPS resources and the downlink SPS resources being dynamically activated.

Some examples of the method, apparatuses, and non-transitory computer-readable medium described herein may further include operations, features, means, or instructions for receiving downlink control information (DCI) separately activating the uplink SPS resources and the downlink SPS resources.

Some examples of the method, apparatuses, and non-transitory computer-readable medium described herein may further include operations, features, means, or instructions for receiving DCI activating the uplink SPS resources and determining that the downlink SPS resources may be activated based on the DCI activating the uplink SPS resources.

Some examples of the method, apparatuses, and non-transitory computer-readable medium described herein may further include operations, features, means, or instructions for receiving DCI activating the downlink SPS resources and determining that the uplink SPS resources may be activated based on the DCI activating the downlink SPS resources.

Some examples of the method, apparatuses, and non-transitory computer-readable medium described herein may further include operations, features, means, or instructions for transmitting a feedback message acknowledging receipt of DCI activating the uplink SPS resources and the downlink SPS resources, where the feedback message may be at least one of a medium access control-control element (MAC-CE) or a hybrid automatic repeat request (HARD) indicator.

Some examples of the method, apparatuses, and non-transitory computer-readable medium described herein may further include operations, features, means, or instructions for receiving DCI deactivating the uplink SPS resources and determining that the downlink SPS resources may be deactivated based on the DCI deactivating the uplink SPS resources.

Some examples of the method, apparatuses, and non-transitory computer-readable medium described herein may further include operations, features, means, or instructions for receiving DCI deactivating the downlink SPS resources and determining that the uplink SPS resources may be deactivated based on the DCI deactivating the downlink SPS resources.

Some examples of the method, apparatuses, and non-transitory computer-readable medium described herein may further include operations, features, means, or instructions for receiving DCI that includes separate indications for deactivating the downlink SPS resources and the uplink SPS resources.

A method for wireless communication at a base station is described. The method may include determining, for a UE, one or more parameters associated with full duplex communications on uplink SPS resources, downlink SPS resources, or both, based on one or more instances of the uplink SPS resources at least partially overlapping in time with one or more instances of the downlink SPS resources, transmitting one or more messages indicative of the uplink SPS resources allocated to the UE and the downlink SPS resources allocated to the UE, the uplink SPS resources and the downlink SPS resources being within a frequency band used for the full duplex communications with the UE, and applying the one or more parameters to reception of uplink communications over the one or more instances of the uplink SPS resources, transmission of downlink communications over the one or more instances of the downlink SPS resources, or both.

An apparatus for wireless communication at a base station is described. The apparatus may include a processor, memory coupled with the processor, and instructions stored in the memory. The instructions may be executable by the processor to cause the apparatus to determine, for a UE, one or more parameters associated with full duplex communications on uplink SPS resources, downlink SPS resources, or both, based on one or more instances of the uplink SPS resources at least partially overlapping in time with one or more instances of the downlink SPS resources, transmit one or more messages indicative of the uplink SPS resources allocated to the UE and the downlink SPS resources allocated to the UE, the uplink SPS resources and the downlink SPS resources being within a frequency band used for the full duplex communications with the UE, and apply the one or more parameters to reception of uplink communications over the one or more instances of the uplink SPS resources, transmission of downlink communications over the one or more instances of the downlink SPS resources, or both.

Another apparatus for wireless communication at a base station is described. The apparatus may include means for determining, for a UE, one or more parameters associated with full duplex communications on uplink SPS resources, downlink SPS resources, or both, based on one or more instances of the uplink SPS resources at least partially overlapping in time with one or more instances of the downlink SPS resources, means for transmitting one or more messages indicative of the uplink SPS resources allocated to the UE and the downlink SPS resources allocated to the UE, the uplink SPS resources and the downlink SPS resources being within a frequency band used for the full duplex communications with the UE, and means for applying the one or more parameters to reception of uplink communications over the one or more instances of the uplink SPS resources, transmission of downlink communications over the one or more instances of the downlink SPS resources, or both.

A non-transitory computer-readable medium storing code for wireless communication at a base station is described. The code may include instructions executable by a processor to determine, for a UE, one or more parameters associated with full duplex communications on uplink SPS resources, downlink SPS resources, or both, based on one or more instances of the uplink SPS resources at least partially overlapping in time with one or more instances of the downlink SPS resources, transmit one or more messages indicative of the uplink SPS resources allocated to the UE and the downlink SPS resources allocated to the UE, the uplink SPS resources and the downlink SPS resources being within a frequency band used for the full duplex communications with the UE, and apply the one or more parameters to reception of uplink communications over the one or more instances of the uplink SPS resources, transmission of downlink communications over the one or more instances of the downlink SPS resources, or both.

In some examples of the method, apparatuses, and non-transitory computer-readable medium described herein, determining the one or more parameters may include operations, features, means, or instructions for determining a relative priority level between the one or more instances of the uplink SPS resources and the one or more instances of the downlink SPS resources and determining the one or more parameters so as to prioritize either the transmission of the uplink communications over the one or more instances of the uplink SPS resources or the reception of the downlink communications over the one or more instances of the downlink SPS resources based on the relative priority level.

In some examples of the method, apparatuses, and non-transitory computer-readable medium described herein, determining the one or more parameters may include operations, features, means, or instructions for determining at least one of a modulation and coding scheme parameter or a rank parameter for either the reception of the uplink communications over the one or more instances of the uplink SPS resources or the transmission of the downlink communications over the one or more instances of the downlink SPS resources.

In some examples of the method, apparatuses, and non-transitory computer-readable medium described herein, determining the one or more parameters may include operations, features, means, or instructions for determining at least one of an uplink transmit power parameter, a frequency hopping parameter, or a precoder parameter for the reception of the uplink communications over the one or more instances of the uplink SPS resources.

In some examples of the method, apparatuses, and non-transitory computer-readable medium described herein, determining the one or more parameters may include operations, features, means, or instructions for applying the one or more parameters to communications during additional non-overlapping instances of the uplink SPS resources and the downlink SPS resources.

In some examples of the method, apparatuses, and non-transitory computer-readable medium described herein, determining the one or more parameters may include operations, features, means, or instructions for applying the one or more parameters to communications during only the one or more instances of the uplink SPS resources and the one or more instances of the downlink SPS resources.

In some examples of the method, apparatuses, and non-transitory computer-readable medium described herein, transmitting the one or more messages may include operations, features, means, or instructions for transmitting a first message for the uplink SPS resources and a second message for the downlink SPS resources.

In some examples of the method, apparatuses, and non-transitory computer-readable medium described herein, transmitting the one or more messages may include operations, features, means, or instructions for transmitting a common message for the uplink SPS resources and the downlink SPS resources.

Some examples of the method, apparatuses, and non-transitory computer-readable medium described herein may further include operations, features, means, or instructions for configuring the common message to indicate a downlink BWP identifier associated with the downlink SPS resources, where an uplink BWP identifier associated with the uplink SPS resources may be associated determined based on the downlink BWP identifier.

Some examples of the method, apparatuses, and non-transitory computer-readable medium described herein may further include operations, features, means, or instructions for configuring the common message to indicate an uplink BWP identifier associated with the uplink SPS resources, where a downlink BWP identifier associated with the downlink SPS resources may be determined based on the uplink BWP identifier.

In some examples of the method, apparatuses, and non-transitory computer-readable medium described herein, transmitting the common message may include operations, features, means, or instructions for transmitting a common set of parameters for both the uplink SPS resources and the downlink SPS resources, separate sets of parameters for the uplink SPS resources and the downlink SPS resources, a first set of parameters for the downlink SPS resources with a first offset for determination of the uplink SPS resources, or a second set of parameters for the uplink SPS resources with a second offset for determination of the downlink SPS resources.

In some examples of the method, apparatuses, and non-transitory computer-readable medium described herein, the common set of parameters, the separate sets of parameters, the first set of parameters, and the second set of parameters each include one or more of time domain resource allocation parameters, frequency domain resource allocation parameters, modulation and coding scheme parameters, rank parameters, or periodicity parameters.

Some examples of the method, apparatuses, and non-transitory computer-readable medium described herein may further include operations, features, means, or instructions for identifying an activation status of the downlink SPS resources and the uplink SPS resources, where the activation status may be based on one of the downlink SPS resources being activated by the common message while the uplink SPS resources may be dynamically activated, the uplink SPS resources being activated by the common message while the downlink SPS resources may be dynamically activated, both the uplink SPS resources and the downlink SPS resources being activated by the common message, or both the uplink SPS resources and the downlink SPS resources being dynamically activated.

Some examples of the method, apparatuses, and non-transitory computer-readable medium described herein may further include operations, features, means, or instructions for transmitting DCI separately activating the uplink SPS resources and the downlink SPS resources.

Some examples of the method, apparatuses, and non-transitory computer-readable medium described herein may further include operations, features, means, or instructions for transmitting DCI activating the uplink SPS resources, where the downlink SPS resources may be activated based on the DCI activating the uplink SPS resources.

Some examples of the method, apparatuses, and non-transitory computer-readable medium described herein may further include operations, features, means, or instructions for transmitting DCI activating the downlink SPS resources, where the uplink SPS resources may be activated based on the DCI activating the downlink SPS resources.

Some examples of the method, apparatuses, and non-transitory computer-readable medium described herein may further include operations, features, means, or instructions for receiving a feedback message acknowledging receipt of DCI activating the uplink SPS resources and the downlink SPS resources, where the feedback message may be at least one of a MAC-CE or an HARQ indicator.

Some examples of the method, apparatuses, and non-transitory computer-readable medium described herein may further include operations, features, means, or instructions for transmitting DCI deactivating the uplink SPS resources, where the downlink SPS resources may be deactivated based on the DCI deactivating the uplink SPS resources.

Some examples of the method, apparatuses, and non-transitory computer-readable medium described herein may further include operations, features, means, or instructions for transmitting DCI deactivating the downlink SPS resources, where the uplink SPS resources may be deactivated based on the DCI deactivating the downlink SPS resources.

Some examples of the method, apparatuses, and non-transitory computer-readable medium described herein may further include operations, features, means, or instructions for transmitting DCI that includes separate indications for deactivating the downlink SPS resources and the uplink SPS resources.

DETAILED DESCRIPTION

Wireless communication systems may use full duplex communications between a user equipment (UE) and base station. The full duplex communications may include the UE and/or base station simultaneously performing uplink communications and downlink communications within a frequency band. Additionally, a base station may allocate resources to a UE for either uplink configured grant (CG) communications (e.g., uplink semi-persistent scheduling (SPS) resources) and downlink SPS communications. In a half-duplex communication system, the allocated resources would not normally overlap. However, in a full-duplex communications system, the CG and SPS resources could overlap. For example, each of the CG and SPS resources allocated to a UE may be configured for a same bandwidth part (BWP). The overlap of the CG and SPS resources could increase self-interference during the full duplex communications.

Generally, the described techniques provide for a UE to modify CG (e.g., uplink SPS) resources or configurations and/or downlink SPS resources or configurations in cases where the allocated resources overlap in the time domain (during full duplex communications, for example). For example, the UE may be separately or commonly configured with both SPS and CG resources to use for full duplex communications. The UE may identify or otherwise determine that instances of downlink communications using the SPS resources overlap in the time domain with instances of uplink communications using the CG resources (e.g., the uplink SPS resources). Accordingly, the UE may modify parameters of the SPS and/or CG resources (e.g., to mitigate or eliminate self-interference during full duplex communications). Selecting which configurations or resources to modify may be based on the priority level of each instance or configuration. The modifications to the parameters may include, but are not limited to, updates to the modulation and coding scheme (MCS), rank, transmit power level, frequency hopping pattern, periodicity, precoders, etc., for the corresponding uplink and downlink communications. The modifications may include dropping one of the communications based on the overlap, in some examples. Accordingly, the UE may apply the modified parameters when performing the uplink and downlink communications (e.g., during the full duplex communications) using the corresponding CG and SPS resources.

Aspects of the disclosure are initially described in the context of wireless communications systems. Aspects of the disclosure are further illustrated by and described with reference to apparatus diagrams, system diagrams, and flowcharts that relate to common downlink and uplink semi-persistent resource configuration for full duplex.

Figure 1:
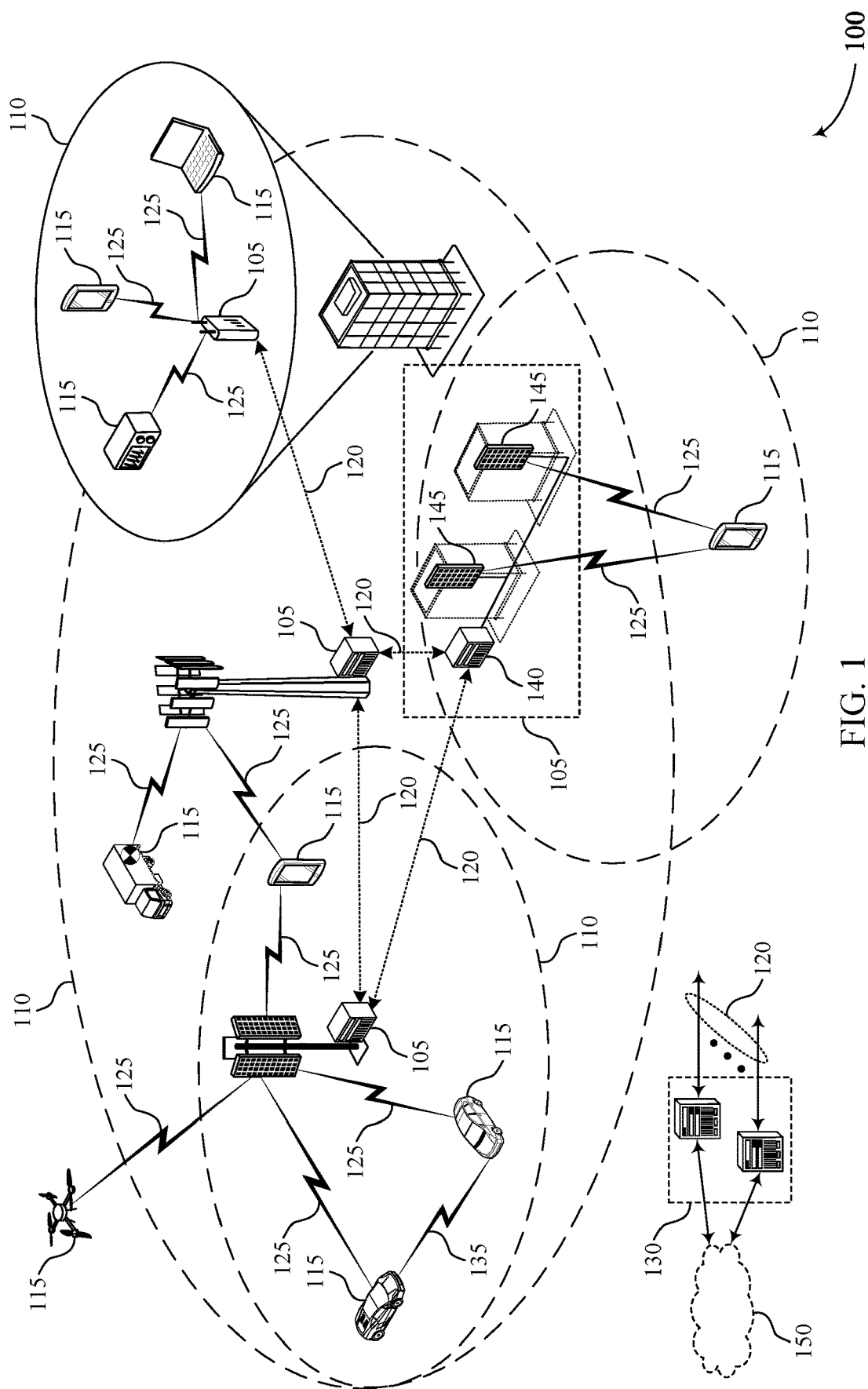
FIG. 1 illustrates an example of a wireless communications system that supports common downlink and uplink semi-persistent resource configuration for full duplex in accordance with aspects of the present disclosure.

FIG. 1 illustrates an example of a wireless communications system 100 that supports common downlink and uplink semi-persistent resource configuration for full duplex in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive one or more messages indicative of uplink SPS resources allocated to the UE 115 and downlink SPS resources allocated to the UE 115, the uplink APA resources and the downlink SPS resources being within a frequency band used for full duplex communications by the UE 115. The UE 115 may modify one or more parameters associated with the full duplex communications on the uplink SPS resources, the downlink SPS resources, or both, based at least in part on one or more instances of the uplink SPS resources at least partially overlapping in time with one or more instances of the downlink SPS resources. The UE 115 may apply the one or more parameters, after modification, to transmission of uplink communications over the one or more instances of the uplink SPS resources, reception of downlink communications over the one or more instances of the downlink SPS resources, or both.

A base station 105 may determine, for a UE 115, one or more parameters associated with full duplex communications on uplink SPS resources, downlink SPS resources, or both, based at least in part on one or more instances of the uplink SPS resources at least partially overlapping in time with one or more instances of the downlink SPS resources. The base station 105 may transmit one or more messages indicative of the uplink SPS resources allocated to the UE 115 and the downlink SPS resources allocated to the UE 115, the uplink SPS resources and the downlink SPS resources being within a frequency band used for the full duplex communications with the UE 115. The base station 105 may apply the one or more parameters to reception of uplink communications over the one or more instances of the uplink SPS resources, transmission of downlink communications over the one or more instances of the downlink SPS resources, or both.

Figure 2:
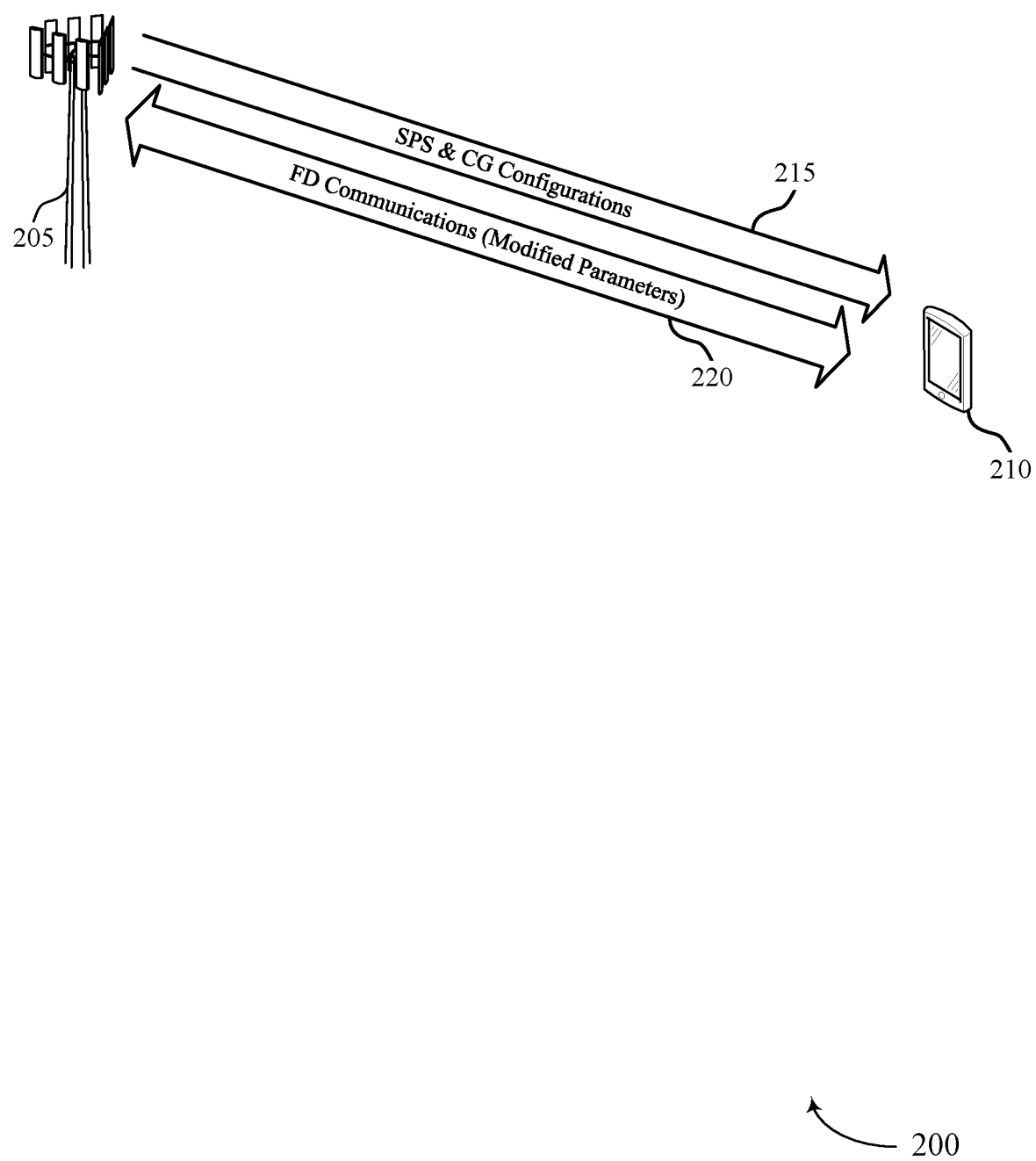
FIG. 2 illustrates an example of a wireless communication system that supports common downlink and uplink semi-persistent resource configuration for full duplex in accordance with aspects of the present disclosure.

FIG. 2 illustrates an example of a wireless communication system 200 that supports common downlink and uplink semi-persistent resource configuration for full duplex in accordance with aspects of the present disclosure. Wireless communication system 200 may implement aspects of wireless communication system 100. Wireless communication system 200 may include base station 205 and/or UE 210, which may be examples of the corresponding devices described herein.

Wireless communication system 200 may support full-duplex communications between base station 205 and UE 210. The full duplex communications may be within a band, such as in-band full-duplex (IBFD) and/or sub-band full-duplex (SBFD) communications. The IBFD communications may include both uplink and downlink communications being scheduled on specific, non-overlapping resources within the band. The SBFD communications may include both uplink and downlink communications being scheduled to overlap in the time domain, but use separate frequency resources. The separate frequency resources in this example may be separated by a guard band to avoid cross-interference.

In some examples, SPS resources may be configured to support the full duplex communications between base station 205 and UE 210. The SPS resources may include uplink SPS resources (e.g., uplink CG resources) as well as downlink SPS resources. Broadly, the downlink SPS and uplink CG may refer to scheduling resources for the downlink and uplink, respectively. For example, the downlink SPS resources may include a downlink time and frequency resource having a given periodicity, MCS, as well as various other parameters that are configured by base station 205 for UE 210. Accordingly, UE 210 may expect to receive downlink transmissions from base station 205 according to the parameters indicated in the downlink SPS resource configuration. Similarly, the uplink SPS resources (e.g., CG) may also include an uplink time and frequency resource having a given periodicity, MCS, as well as various other parameters that are configured by base station 205 for UE 210. CG resources are typically configured according to two types, a first type that relies on a DCI to activate the CG resources and the other type that does not rely on the DCI to activate the CG resources.

Accordingly, a full-duplex UE (such as UE 210) may be receiving a downlink transmission and transmitting an uplink transmission at the same time and in the same frequency band in either IUD or SBFD. However, according to conventional techniques the downlink SPS and CG are configurations within a downlink BWP and uplink BWP, respectively. That is, the downlink SPS resources/configurations are typically configured for a given downlink BWP of UE 210 and the uplink SPS resources/configurations (e.g., CG) are typically configured for a given uplink BWP of UE 210.

This approach may be problematic for a number of reasons. For example, full-duplex operations may result in self-interference, which may add an additional constraints on how the downlink SPS and uplink SPS are configured. That is, in some situations the uplink SPS resources may introduce self often interference for the corresponding downlink SPS resources, or vice versa. Accordingly, such techniques provide little or no connection between the uplink SPS and downlink SPS configurations provided by base station 205 to UE 210. Similar to half-duplex operations, a full-duplex UE may receive a DCI that activates one of the CG configurations over the other, or activates both CG configurations.

Accordingly, aspects of the described techniques provide for configuration constraints based on RRC configurations of downlink SPS resources and uplink SPS resources (e.g., CG resources). Broadly, if SPS and CG configurations overlap in time and either IBFD or SBFD, UE 210 may be RRC configured to resolve such issues. That is, since the uplink transmission impacts a downlink reception at UE 210 and/or downlink transmissions impacts uplink receptions at base station 205, the configuration constraints (e.g., modifying parameters of either or both configurations) can be any variations in the SPS and/or CG configurations (e.g., an MCS reduction in SPS configuration and/or CG configuration, increment or decrement transmit power, using a different frequency hopping pattern, different CG precoders, using different P0 (e.g., transmit power) values for PUSCH, and the like. Accordingly, aspects of the described techniques enable base station 205 and/or UE 210 to modify or otherwise change one or more parameters of downlink SPS configuration and/or uplink SPS configuration (e.g., CG) based on overlapping instances in the time domain. Since the downlink SPS configuration and uplink SPS configuration may have different periodicities, not all allocations (e.g., instances) of SPS would overlap with CG, or vice versa. Accordingly, in some examples UE 210 may be configured to apply the changes in all resources or in just the overlapping resources (e.g., and overlapping instances).

For example, base station 205 may identify or otherwise determine, for UE 210, parameters associated with full-duplex communications on uplink SPS resources and/or downlink SPS resources. For example, base station 205 may determine the parameters based on one or more instances of the uplink SPS resources at least partially overlapping in the time domain with one or more instances of the downlink SPS resources. For example, they station 205 may identify, select, or otherwise determine the parameters for the downlink SPS and uplink SPS (e.g., CG) resources in order to mitigate or avoid overlapping instances of the downlink SPS resources and uplink SPS resources.

Accordingly, base station 205 may transmit or otherwise convey one or more messages 215 to UE 210 indicating the uplink SPS resources and the downlink SPS resources allocated to UE 210. As discussed, the uplink SPS resources in the downlink SPS resources may be within a frequency band use for a full-duplex communications between base station 205 and UE 210. The one or more messages 215 may be RRC messages configuring the SPS resource configurations for uplink and downlink communications. For example, base station 205 may transmit a first message indicating the uplink SPS resources and the second message indicating the downlink SPS resources. In another example, base station 205 may transmit a common message indicating the uplink SPS resources and the downlink SPS resources.

UE 210 may receive or otherwise obtain the one or more messages 215 indicating the uplink SPS resources and the downlink SPS resources allocated to UE 210 by base station 205. Accordingly, UE 210 may identify or otherwise determine that one or more instances of the uplink SPS resources overlap in the time domain (e.g., fully overlap or at least partially overlap), or vice versa. Accordingly, UE 210 may change or otherwise modify one or more parameters associated with full-duplex communications on the uplink SPS resources and/or downlink SPS resources based on the overlap.

For example, if the downlink SPS resources in the uplink SPS resources overlap in the time domain in either a IBFD or SBFD manner, UE 210 may implicitly assume certain modifications to the configurations of the downlink SPS resources and/or uplink SPS resources. The parameters to be modified may be based on various metrics associated with the full-duplex communications.

In one example may include modifying the parameters based on the relative priority level associated with the overlapping uplink and downlink communications. For example, base station 205 and/or UE 210 may identify or otherwise determine the relative priority level between the overlapping instances of the uplink SPS resources in the downlink SPS resources. Base station 205 and/or UE 210 may modify the parameters in order to prioritize either the transmission of the uplink communications over the uplink SPS resources or reception of the downlink communications over the downlink SPS resources based on the relative priority level. Accordingly, if the downlink SPS resources and uplink SPS resources overlap in the time domain in either IBFD or SBFD, base station 205 and/or UE 210 may implicitly assume certain modifications to the configurations of the downlink SPS resources and/or uplink SPS resources based on the priority of both downlink SPS and uplink SPS. For example, if the downlink communication over the downlink SPS resources has a higher priority than the uplink communications over the uplink SPS resources, UE 210 may lower the uplink transmit power of the uplink SPS resources to protect the downlink reception over the downlink SPS resources from self-interference at UE 210, or may simply drop that instance of the uplink communications over the uplink SPS resource that overlaps with the downlink SPS resource. In some aspects, each configuration of the downlink SPS resources and the uplink SPS resources can also include, or otherwise be configured with, a default rank to switch to based on the priority of each configuration (e.g., Rank1_SPS and Rank1_CG when both SPS and CG have high priority, Rank2_SPS and Rank2_CG when SPS has a higher priority and CG has a lower priority, and the like).

Another example of modifying the parameters may include modifying an MCS parameter and/or rank parameter for the transmission of the uplink communications over the uplink SPS resources are reception of the downlink medications over the downlink SPS resources for the one or more overlapping instances. For example, base station 205 and/or UE 210 may change or otherwise modify the MCS, rank, etc. for the uplink communications and/or downlink communications in the full-duplex communications to mitigate the overlapping instances of the downlink SPS resources and the uplink SPS resources.

Another example of modifying the parameters may include modifying an uplink transmit power parameter, a frequency hopping parameter, and/or a precoder parameter for transmission of the uplink communications over the overlapping instances of the uplink SPS resources. Again, base station 205 and/or UE 210 may change or otherwise modify such parameters for the uplink communications in the full duplex communications to mitigate the overlapping instances of the downlink SPS resources and the uplink SPS resources.

As discussed above, in some examples base station 205 may transmit the one or more messages 215 to UE 210 indicating the uplink SPS resources in the downlink SPS resources in separate messages (e.g., in a first message for the uplink SPS resources and the second message for the downlink SPS resources) and/or in a common message indicating both the uplink SPS resources and the downlink SPS resources. In the situation where a common message is used to configure or otherwise indicate both the uplink SPS resources in the downlink SPS resources, various other considerations may be provided.

For example, for the full-duplex operations the downlink BWP identifier may be linked to the uplink BWP identifier, or vice versa. In this example, the downlink BWP and the uplink BWP may contain or otherwise convey one configuration setting for both the downlink SPS resources and the uplink SPS resources that operate in a full half duplex manner (e.g., meaning that they overlap in time and in frequency, IBFD or SBFD, etc.). Accordingly, in one example base station 205 and/or UE 210 may determine, based on the common message, the downlink BWP identifier associated with the downlink SPS resources, and determine the uplink BWP identifier associated with the uplink SPS resources based on the downlink BWP identifier. Conversely, base station 205 and/or UE 210 may determine, based on the common message, an uplink BWP identifier associated with the uplink SPS resources, and determine the downlink BWP identifier associated with the downlink SPS resources based on the uplink BWP identifier.

In some examples, the common message may carry or otherwise convey an indication of a common set of parameters for both the uplink SPS resources in the downlink SPS resources, separate sets of parameters for the uplink SPS resources in the downlink SPS resources, a first set of parameters for the downlink SPS resources within accompanying first offset for determining the uplink SPS resources, or a second set of parameters for the uplink SPS resources within accompanying second offset for determination of the downlink SPS resources. The parameters may include one or more of a time domain resource allocation (TDRA) parameters, the frequency domain resource allocation (FDRA) parameters, MCS parameters, rank parameters, periodicity parameters, frequency hopping parameters, and the like. For example, the TDRA configuration may include a first option with the one TDRA configuration indicated for both the downlink SPS resources and the uplink SPS resources, a second option with one TDRA configuration indicated for the downlink SPS resources with a time shift (e.g., offset) to be applied to identify or otherwise obtain the TDRA configuration for the uplink SPS resources, and/or a third option where one TDRA configuration is indicated for the downlink SPS resources and another TDRA configuration is indicated for the uplink SPS resources. Similar examples may be applied for the FDRA parameter, the MCS parameter, the rank parameter, the periodicity parameter, and the like. The configuration indicated in the common message may also be referred to as an SPS_CG configuration (e.g., indicating that the common message configures both the downlink SPS resources and the uplink SPS resources, which may also be referred to as CG resources).

Accordingly, base station 205 and/or UE 210 may apply the modified parameters to transmissions of uplink communications over the uplink SPS resources and/or to reception of downlink communications over the downlink SPS resources (e.g., during full-duplex communications 220). In some examples, base station 205 and/or UE 210 may apply the modified parameters to communications during non-overlapping instances of the uplink SPS resources and the downlink SPS resources. In other examples, base station 205 and/or UE 210 may apply the modified parameters to communications during only the overlapping instances of the uplink SPS resources and the downlink SPS resources.

In some aspects, the downlink SPS resources and/or the uplink SPS resources may be activated/deactivated according to various techniques. For example, three types of SPS_CG configurations may be applied. A Type one SPS_CG configuration may include the downlink SPS resources always being active while the uplink SPS resources use a DCI for activation. A Type two SPS_CG configuration may include the downlink SPS resources using a DCI for activation and the uplink SPS resources being always active. A Type three SPS_CG configuration may include both the downlink SPS resources and the uplink SPS resources using a DCI for activation. A Type four SPS_CG configuration may include both the downlink SPS resources and the uplink SPS resources being always active (e.g., do not require DCI activation).

Accordingly, in some aspects base station 205 and/or UE 210 may identify or otherwise determine the activation status of the downlink SPS resources and the uplink SPS resources. The activation status may be based on the downlink SPS resources being activated by the common message while the uplink SPS resources are dynamically activated (e.g., DCI activated, such as in the Type one SPS_CG configuration), the uplink SPS resources being activated by the common message while the downlink SPS resources being dynamically activated (e.g., such as in the Type two SPS_CG configuration), both the uplink SPS resources in the downlink SPS resources being activated by the common message (such as in the Type three SPS_CG configuration), or both the uplink SPS resources and the downlink SPS resources being dynamically activated (e.g., such as in the Type four SPS_CG configuration).

In some aspects, UE 210 may receive a DCI from base station 205 that activates the linked downlink SPS resources and uplink SPS resources. For example, the DCI may carry or otherwise convey two bits, with one bit activating/deactivating the downlink SPS configurations and another bit activating/deactivating the uplink SPS configuration. In another example, the downlink SPS resources and uplink SPS resources may be linked by RRC configuration (e.g., SPS-Configuration-r16 is configured within the uplink SPS RRC configuration or ConfiguredGrantConfigIndex is configured as part of the downlink SPS resource RRC configuration). Accordingly, activation of the uplink SPS resources automatically activates the linked downlink SPS resources, or vice versa. In the situation where UE 210 is configured with the Type one or Type two SPS_CG configuration, UE 210 may expect one bit activation for the proper type in the DCI, and may ignore the other bit.

Accordingly, in some examples base station 205 may transmit or otherwise provide (and UE 210 may receive or otherwise obtain) a DCI separately activating the uplink SPS resources and the downlink SPS resources. In some examples, UE 210 may receive or otherwise obtain a DCI activating the uplink SPS resources and determine that the downlink SPS resources are activated based on the DCI activating the uplink SPS resources. Conversely, UE 210 may receive or otherwise obtain a DCI activating the downlink SPS resources and determine that the uplink SPS resources are activated based on the DCI activating the downlink SPS resources.

In some aspects, UE 210 may confirm activation of the uplink SPS resources and/or downlink SPS resources to base station 205. For example, UE 210 may transmit or otherwise convey a feedback message to base station 205 acknowledging receipt of DCI activating the uplink SPS resources and/or the downlink SPS resources. In some examples, the feedback message may be a MAC CE (e.g., six bits), such as when the SPS resources are activating using an uplink DCI format 0_0 or 0_1. In another example where the activating DCI is a DCI format 0_1, 0_0, or 0_2, the feedback message may use a HARQ ACK/NACK type indication (e.g., a HARQ indicator) to acknowledge the activating DCI. In some aspects, this example may be suitable for a Type three SPS_CG configuration where the downlink SPS resources and the uplink SPS resources are jointly activated.

The deactivation of the downlink SPS resources and/or uplink SPS resources may also be considered. For example, a full-duplex UE (such as UE 210) may receive a DCI from base station 205 that deactivates the link downlink SPS resources and/or uplink SPS resources. Broadly, the deactivation DCI may automatically deactivate both SPS resources and/or may deactivate one resource explicitly, and implicitly deactivate the linked, other resource. That is, in one example the downlink DCI format deactivating the downlink SPS resources (e.g., using MCS='11111,' FDRA all 1's, etc.) may automatically deactivate the linked uplink SPS resource. Conversely, the uplink DCI format 0_1 deactivating the uplink SPS resources may automatically deactivate the linked downlink SPS resources (e.g., acknowledgment may be based on the MAC CE signaling). In another example, a re-configurable bit field may be added to the downlink DCI (or uplink DCI), and may include one bit used to activate/deactivate the downlink SPS resources and another bit used to activate/deactivate the uplink SPS resources.

Accordingly, in some examples UE 210 may receive or otherwise obtain a DCI deactivating the uplink SPS resources, and determine that the downlink SPS resources are deactivated based on the DCI deactivating the uplink SPS resources. Conversely, in other examples UE 210 may receive or otherwise obtain a DCI deactivating the downlink SPS resources, and determine that the uplink SPS resources are deactivated based on the DCI deactivating the downlink SPS resources. In another option, the DCI may include separate indications for deactivating the downlink SPS resources and the uplink SPS resources.

Figure 3:
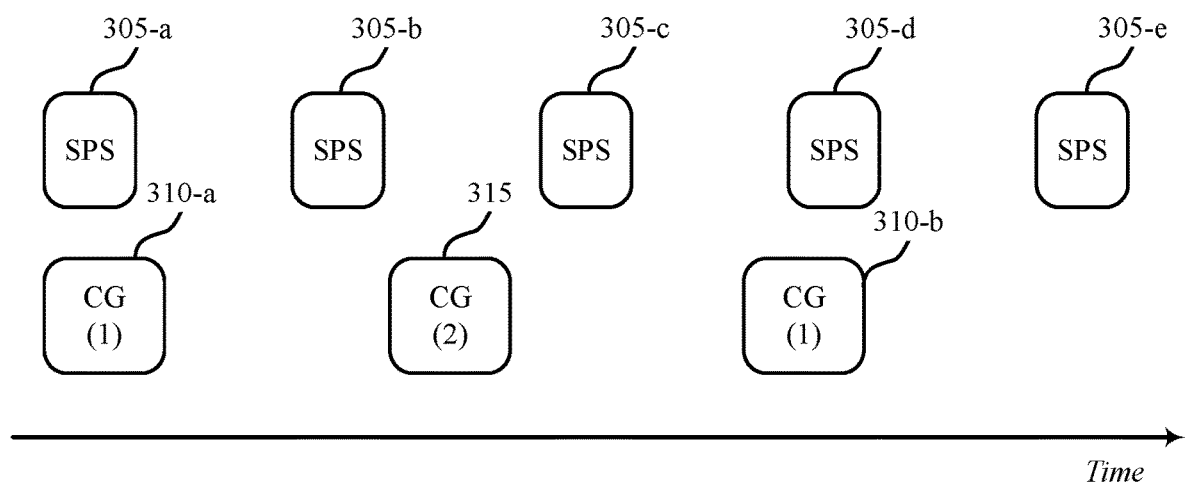
FIG. 3 illustrates an example of a resource configuration that supports common downlink and uplink semi-persistent resource configuration for full duplex in accordance with aspects of the present disclosure.

FIG. 3 illustrates an example of a resource configuration 300 that supports common downlink and uplink semi-persistent resource configuration for full duplex in accordance with aspects of the present disclosure. Aspects of resource configuration 300 may be implemented by wireless communication systems 100 and/or 200. Aspects of resource configuration 300 may be implemented at, or implemented by, a base station and/or UE, which may be examples of the corresponding devices described herein.

As discussed above, aspects of the described techniques provide for a base station to select, determine, or otherwise identify, one or more parameters associated with full duplex communications on uplink SPS resources (e.g., CG resources) and/or downlink SPS resources. The parameters may be determined based on one or more instances of the uplink SPS resources at least partially overlapping in time with one or more instances of the downlink SPS resources. That is, the base station may attempt to configure or otherwise allocate downlink SPS resources and uplink SPS resources to the UE to avoid or mitigate, where possible, overlapping instances of the downlink SPS resources and the uplink SPS resources. However, overlapping resources may not be avoidable in all situations.

Accordingly, the base station may transmit or otherwise provide one or more messages to the UE identifying or otherwise indicating the uplink SPS resources and the downlink SPS resources allocated to the UE. The uplink SPS resources and downlink SPS resources may be within a frequency band (e.g., IBFD or SBFD) used for full duplex communications between the base station and the UE. The one or more messages may include one example where a single message (e.g., a common message) indicates both the downlink SPS resources and the uplink SPS resources, explicitly and/or implicitly. Another example may include a first message indicating the downlink SPS resources, with the second message indicating the uplink SPS resources, or vice versa.

Accordingly, the UE may receive the one or more messages and modify one or more parameters associated with the full-duplex communications on the uplink SPS resources and/or the downlink SPS resources based on one or more instances of the uplink SPS resources at least partially overlapping in time with one or more instances of the downlink SPS resources. This is illustrated in resource configuration 300 of FIG. 3 as a set of downlink SPS resources 305 allocated to the UE and indicated in the one or more messages. In the non-limiting example illustrated in FIG. 3, the UE is indicated/configured with two uplink SPS resources (e.g., a first uplink SPS resources 310 and a second uplink SPS resource 315), such as CG resources/configurations. As is illustrated, one or more instances of the downlink SPS resources 305 at least partially overlap in time with one or more instances of the uplink SPS resources. In particular, downlink SPS resource 305-*a* at least partially overlaps with the first uplink SPS resource 310-*a* in the time domain. Additionally, downlink SPS resource 305-*d* at least partially overlaps with the first uplink SPS resource 310-*b* in the time domain.

Accordingly, the UE may modify or change one or more parameters associated with the full-duplex communications on the uplink SPS resources and/or the downlink SPS resources based on the at least partially overlapping instances. For example, the UE may determine the relative priority level between the overlapping instances and modify the parameters in order to prioritize one instance. Additional parameters that may be modified may include, but are not limited to, an MCS parameter, a rank parameter, an uplink transmit power parameter, a frequency hopping parameter, a precoder parameter, and the like. The UE and base station may apply the modified parameters to the full duplex communications (e.g., to transmissions of uplink communications over the uplink SPS resources and reception of downlink communications over the downlink SPS resources).

Accordingly, the described techniques enable the UE and/or base station to implicitly modify parameters of the downlink SPS resources and/or uplink SPS resources (e.g., CG resources/configuration) based on overlapping instances of the allocated resources. This technique may enable improved scheduling and/or allocation of SPS resources for the UE, and may improve utilization of such overlapping resources for full duplex communications.

Figure 4:
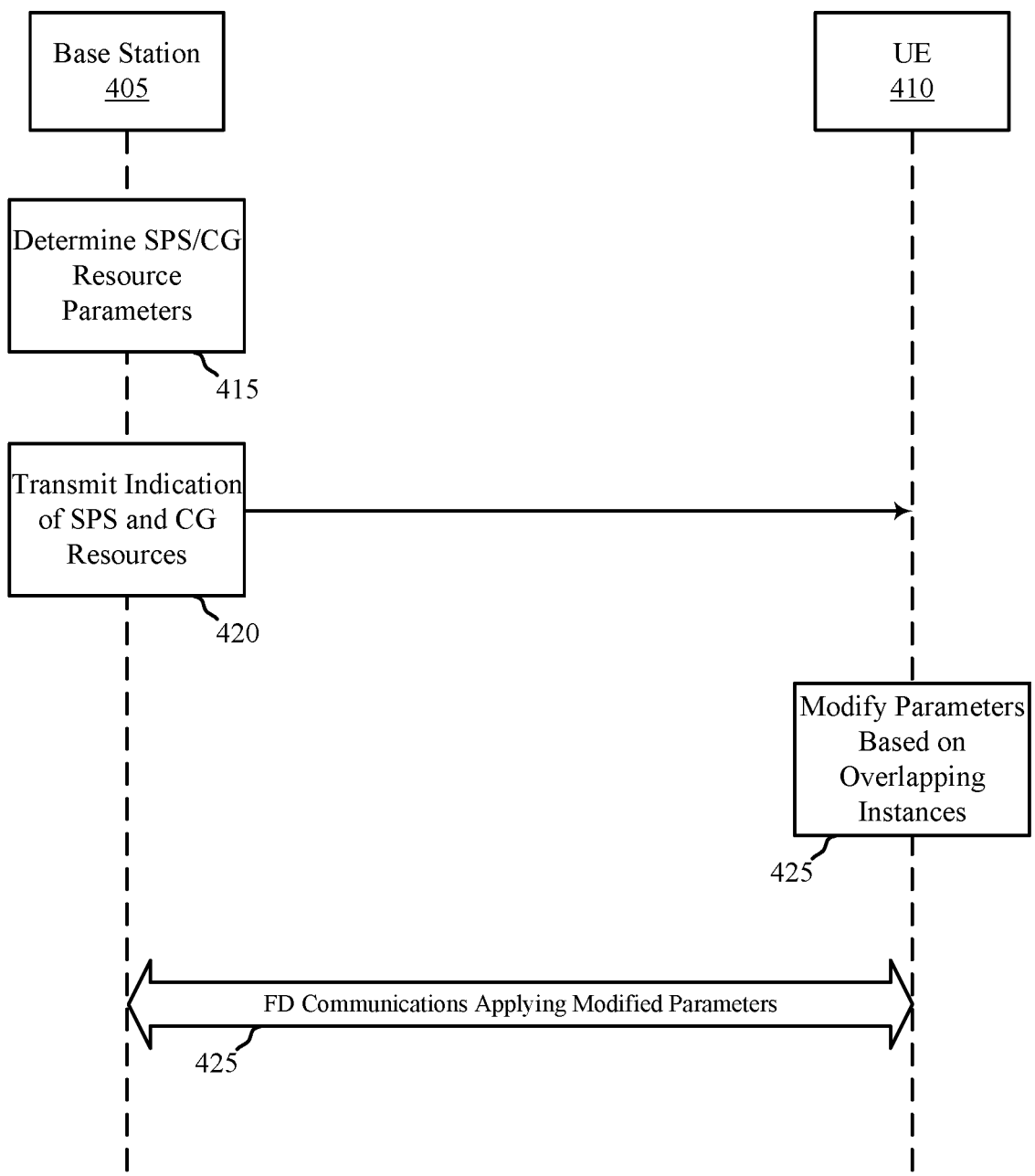
FIG. 4 illustrates an example of a process that supports common downlink and uplink semi-persistent resource configuration for full duplex in accordance with aspects of the present disclosure.

FIG. 4 illustrates an example of a process 400 that supports common downlink and uplink semi-persistent resource configuration for full duplex in accordance with aspects of the present disclosure. Aspects of process 400 may be implemented at, or implemented by, wireless communication systems 100 and/or 200, and/or resource configuration 300. Aspects of process 400 may be implemented at, or implemented by, base station 405 and/or UE 410, which may be examples of the corresponding devices described herein.

At 415, base station 405 may identify or otherwise determine, for UE 410, parameters associated with full-duplex communications on uplink SPS resources (e.g., CG resources) and/or downlink SPS resources. The parameters may be identified or otherwise determined based on one or more instances of the uplink SPS resources at least partially overlapping in the time domain with one or more instances of the downlink SPS resources. For example, base station 405 may identify or otherwise determine the parameters as part of configuring UE 410 with SPS resources for full duplex communications. Where possible, base station 405 may identify or otherwise determine the resources such that overlapping instances of the uplink SPS resources and downlink SPS resources are avoided.

At 420, base station 405 may transmit or otherwise provide (and UE 410 may receive or otherwise obtain) one or more messages indicating the uplink SPS resources and the downlink SPS resources allocated to UE 410. In some aspects, the uplink SPS resources and the downlink SPS resources may be within a frequency band (e.g., IBFD and/or SBFD) used for the full duplex communications between base station 405 and UE 410. In some examples, the one or more messages may be RRC messages configuring the uplink SPS resources and downlink SPS resources. In some examples, the one or more messages may include a common message that indicates or otherwise configures both the uplink SPS resources and the downlink SPS resources. In other examples, the one or more messages may include a first message indicating the uplink SPS resources and a second message indicating the downlink SPS resources, or vice versa.

In some examples, the common message may explicitly and/or implicitly indicate or otherwise configure the uplink SPS resources and the downlink SPS resources. For example, the common message may identify or otherwise indicate a downlink BWP identifier associated with the downlink SPS resources. In this example, UE 410 may identify or otherwise determine the uplink BWP associated with the uplink SPS resources based on the downlink BWP identifier (e.g., the downlink BWP identifier may be linked or otherwise associated with the uplink BWP identifier of the uplink SPS resources). Conversely, the common message may identify or otherwise indicate the uplink BWP identifier associated with the uplink SPS resources. In this example, UE 410 may identify or otherwise determine the downlink BWP associated with the downlink SPS resources based on the uplink BWP identifier (e.g., the uplink BWP identifier may be linked or otherwise associated with the downlink BWP identifier of the downlink SPS resources).

In some aspects, the common message may indicate the parameters for the uplink SPS resources and downlink SPS resources according to different configurations. For example, the common message may carry or otherwise convey an indication of a common set of parameters for both the uplink SPS resources and the downlink SPS resources. In another example, the common message may carry or otherwise convey an indication of separate sets of parameters for the uplink SPS resources and the downlink SPS resources. In another example, the common message may carry or otherwise convey an indication of a first set of parameters for the downlink SPS resources along with a first offset which may be used for determination of the uplink SPS resources. In yet another example, the common message may carry or otherwise convey an indication of a second set of parameters for the uplink SPS resources along with a second offset which may be used for determination of the downlink SPS resources. Example parameters indicated for the uplink SPS resources and/or downlink SPS resources include, but are not limited to, a TDRA, a FDRA, and MCS, a rank parameters, frequency hopping parameters, periodicity parameters, and the like.

At 425, UE 410 may change or otherwise modify one or more parameters associated with the full-duplex communications on the uplink SPS resources and/or the downlink SPS resources. For example, UE 410 may identify or otherwise determine that one or more instances of the uplink SPS resources at least partially overlap in the time domain with one or more instances of the downlink SPS resources. In some aspects, modification of the parameters may be based on various metrics.

In one example, this may include base station 405 and/or UE 410 identifying or otherwise determining the priority level between the overlapping instances of the uplink SPS resources and the downlink SPS resources. For example, base station 405 and/or UE 410 may identify or otherwise determine the priority level of the uplink communications on the overlapping instance of the uplink SPS resources and the priority level of the downlink communications over the downlink SPS resources. Base station 405 and/or UE 410 may modify the parameters in order to prioritize transmission of the uplink communications or reception of the downlink communications based on the relative priority level between each instance. For example, the uplink communications having a higher priority level than the downlink communications may be prioritized according to the modified parameters. Conversely, the downlink communications having a higher priority level than the uplink communications may be prioritized according to the modified parameters.

In some aspects, the parameters to be modified may be based on mitigating or avoiding self-interference between base station 405 and UE 410 during the full duplex communications. For example, base station 405 and/or UE 410 may modify an MCS parameter and/or a rank parameter for the uplink communications and/or downlink communications based on the overlapping instances. In another example, base station 405 and/or UE 410 may modify an uplink transmit power parameter, a frequency hopping parameter, and/or a precoder parameter for the uplink communications during the overlapping instances.

At 430, base station 405 and UE 410 may apply the modified parameters to transmissions of uplink communications over the one or more instances of the uplink SPS resources and/or reception of downlink communications over the one or more instances of the downlink SPS resources (e.g., during the full duplex communications). In some aspects, this may include base station 405 and UE 410 applying the modified parameters to only the overlapping instances of the uplink SPS resources and downlink SPS resources or to all instances of the uplink SPS resources and downlink SPS resources (e.g., to the non-overlapping instances too).

In some aspects, the full duplex communications using the modified parameters of the uplink SPS resources and/or downlink SPS resources may be based on the activation status of the corresponding resources. In one example, the common message may automatically activate the downlink SPS resources, with the uplink SPS resources being dynamically activated (e.g., using a DCI activation). In another example, the common message may automatically activate the uplink SPS resources, with the downlink SPS resources being dynamically activated (e.g., using a DCI activation). In another example, the common message may automatically activate both the uplink SPS resources and the downlink SPS resources (e.g., the resources may be activated upon configuration). In yet another example, both the uplink SPS resources and the downlink SPS resources may be dynamically activated (e.g., using a DCI activation).

Accordingly, in some examples base station 405 may transmit or otherwise provide (and UE 410 may receive or otherwise obtain) DCI separately activating the uplink SPS resources and the downlink SPS resources. In another example, base station 405 may transmit or otherwise provide (and UE 410 may receive or otherwise obtain) a DCI activating the downlink SPS resources, and determine that the uplink SPS resources are activated based on the DCI activating the downlink SPS resources. Conversely, base station 405 may transmit or otherwise provide (and UE 410 may receive or otherwise obtain) DCI activating the uplink SPS resources, and determine that the downlink SPS resources are activated based on the DCI activating the uplink SPS resources. In some examples, UE 410 may transmit or otherwise provide (and base station 405 may receive or otherwise obtain) a feedback message acknowledging receipt of DCI activating the uplink SPS resources and/or the downlink SPS resources. The feedback message may include a MAC CE based feedback message (e.g., using one or more bits) and/or a HARQ indicator (e.g., using ACK/NACK indications).

Accordingly, base station 405 and UE 410 may more intelligently support full duplex communications using SPS resources during overlapping instances of the active SPS resources.

Figure 5:
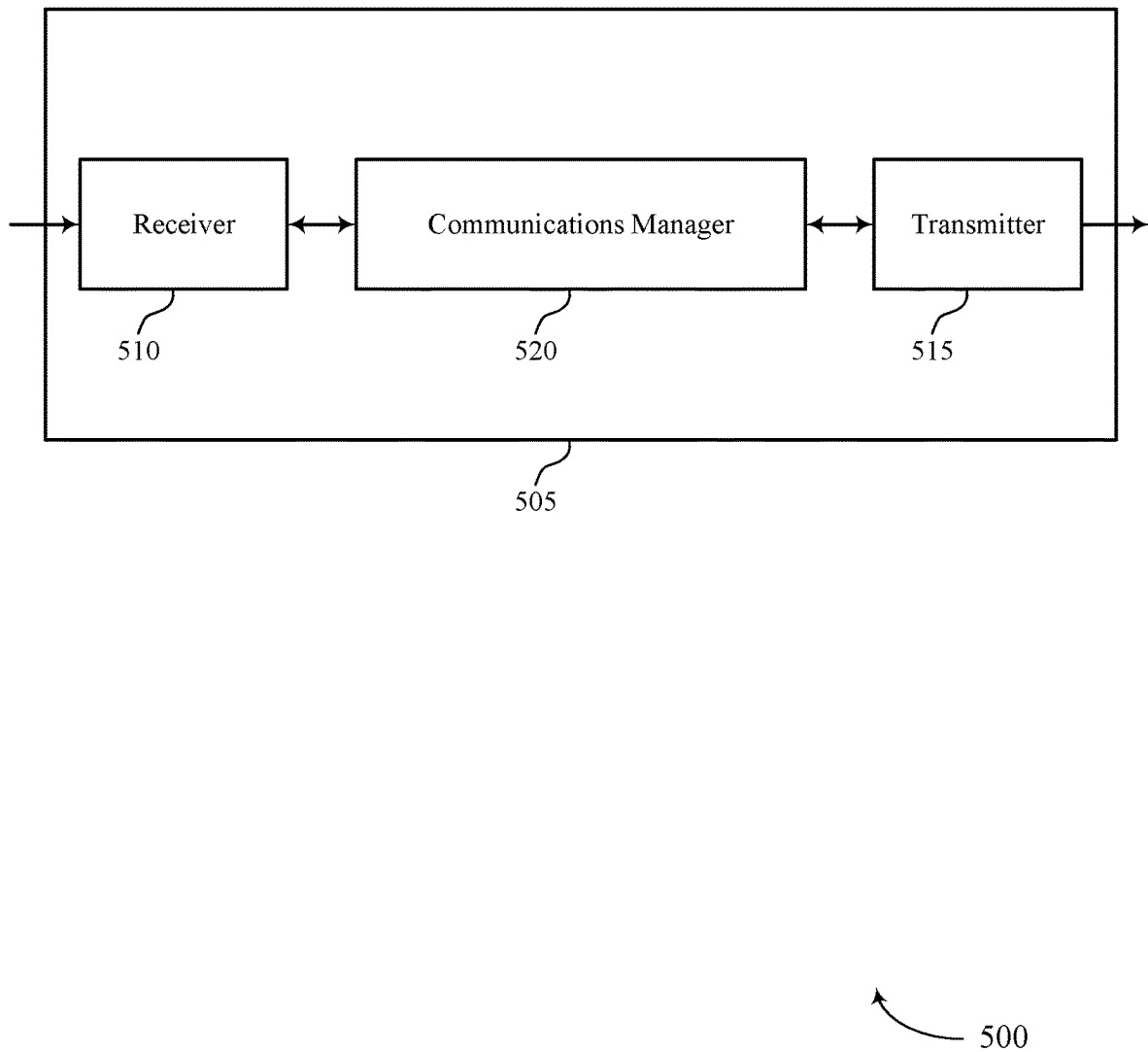
FIGS. 5 and 6 show block diagrams of devices that support common downlink and uplink semi-persistent resource configuration for full duplex in accordance with aspects of the present disclosure.

FIG. 5 shows a block diagram 500 of a device 505 that supports common downlink and uplink semi-persistent resource configuration for full duplex in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to common downlink and uplink semi-persistent resource configuration for full duplex). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to common downlink and uplink semi-persistent resource configuration for full duplex). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of common downlink and uplink semi-persistent resource configuration for full duplex as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving one or more messages indicative of uplink SPS resources allocated to the UE and downlink SPS resources allocated to the UE, the uplink SPS resources and the downlink SPS resources being within a frequency band used for full duplex communications by the UE. The communications manager 520 may be configured as or otherwise support a means for modifying one or more parameters associated with the full duplex communications on the uplink SPS resources, the downlink SPS resources, or both, based on one or more instances of the uplink SPS resources at least partially overlapping in time with one or more instances of the downlink SPS resources. The communications manager 520 may be configured as or otherwise support a means for applying the one or more parameters, after modification, to transmission of uplink communications over the one or more instances of the uplink SPS resources, reception of downlink communications over the one or more instances of the downlink SPS resources, or both.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improving full duplex communications using SPS resources when instance(s) of the SPS resources overlap in the time domain.

Figure 6:
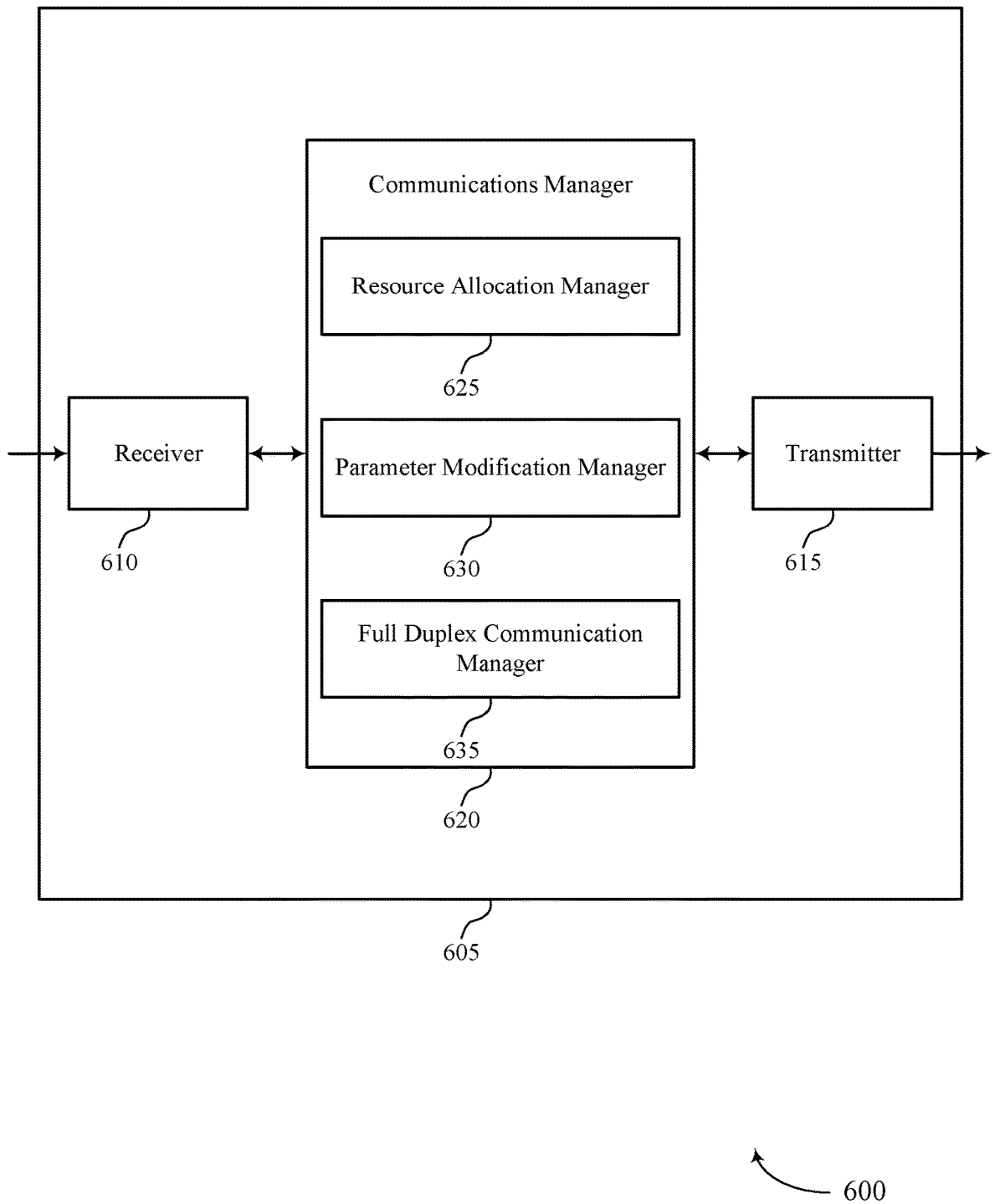

FIG. 6 shows a block diagram 600 of a device 605 that supports common downlink and uplink semi-persistent resource configuration for full duplex in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to common downlink and uplink semi-persistent resource configuration for full duplex). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to common downlink and uplink semi-persistent resource configuration for full duplex). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of common downlink and uplink semi-persistent resource configuration for full duplex as described herein. For example, the communications manager 620 may include a resource allocation manager 625, a parameter modification manager 630, a full duplex communication manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The resource allocation manager 625 may be configured as or otherwise support a means for receiving one or more messages indicative of uplink SPS resources allocated to the UE and downlink SPS resources allocated to the UE, the uplink SPS resources and the downlink SPS resources being within a frequency band used for full duplex communications by the UE. The parameter modification manager 630 may be configured as or otherwise support a means for modifying one or more parameters associated with the full duplex communications on the uplink SPS resources, the downlink SPS resources, or both, based on one or more instances of the uplink SPS resources at least partially overlapping in time with one or more instances of the downlink SPS resources. The full duplex communication manager 635 may be configured as or otherwise support a means for applying the one or more parameters, after modification, to transmission of uplink communications over the one or more instances of the uplink SPS resources, reception of downlink communications over the one or more instances of the downlink SPS resources, or both.

Figure 7:
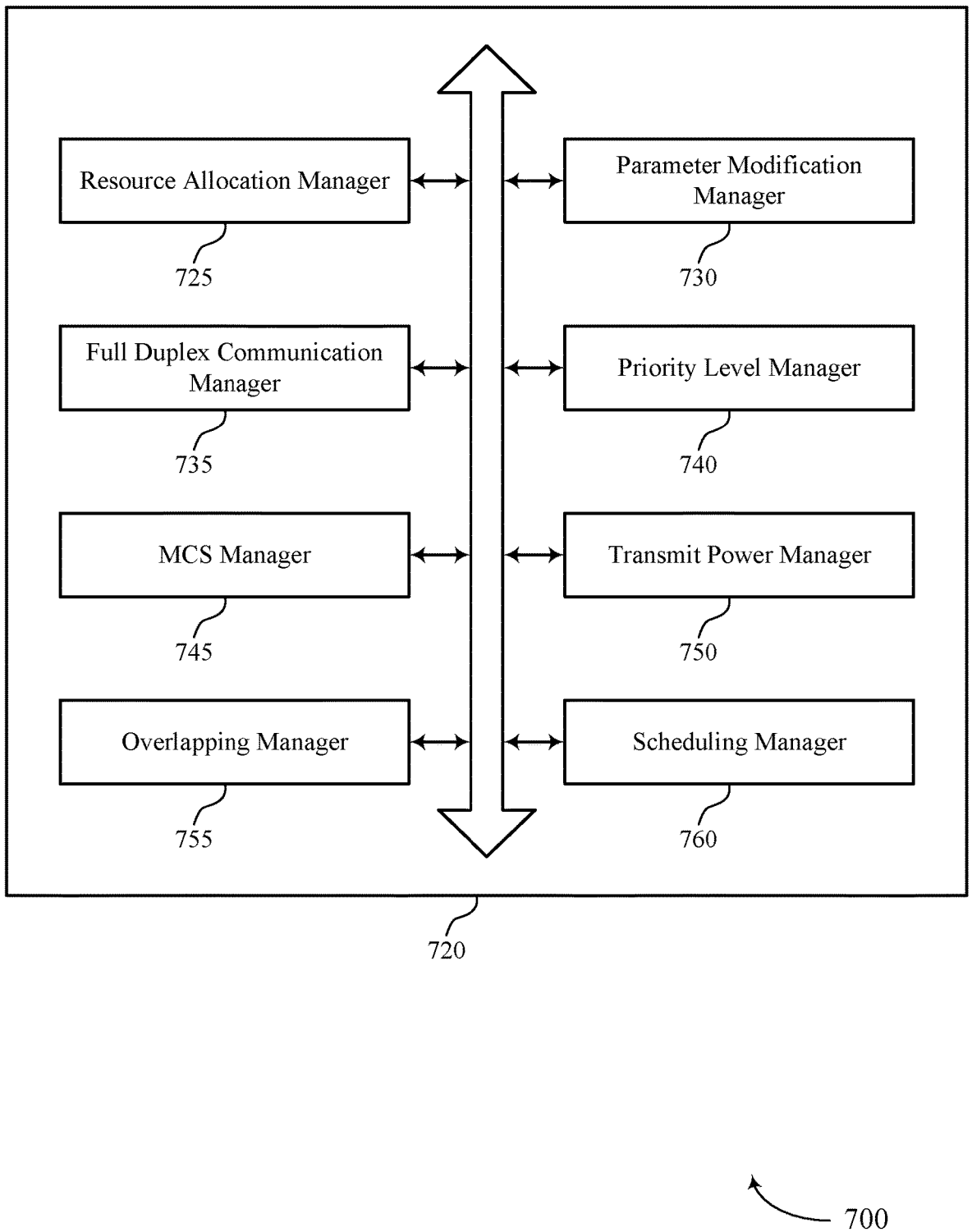
FIG. 7 shows a block diagram of a communications manager that supports common downlink and uplink semi-persistent resource configuration for full duplex in accordance with aspects of the present disclosure.

FIG. 7 shows a block diagram 700 of a communications manager 720 that supports common downlink and uplink semi-persistent resource configuration for full duplex in accordance with aspects of the present disclosure. The communications manager 720 may be an example of aspects of a communications manager 520, a communications manager 620, or both, as described herein. The communications manager 720, or various components thereof, may be an example of means for performing various aspects of common downlink and uplink semi-persistent resource configuration for full duplex as described herein. For example, the communications manager 720 may include a resource allocation manager 725, a parameter modification manager 730, a full duplex communication manager 735, a priority level manager 740, an MCS manager 745, a transmit power manager 750, an overlapping manager 755, a scheduling manager 760, or any combination thereof. Each of these components may communicate, directly or indirectly, with one another (e.g., via one or more buses).

The communications manager 720 may support wireless communication at a UE in accordance with examples as disclosed herein. The resource allocation manager 725 may be configured as or otherwise support a means for receiving one or more messages indicative of uplink SPS resources allocated to the UE and downlink SPS resources allocated to the UE, the uplink SPS resources and the downlink SPS resources being within a frequency band used for full duplex communications by the UE. The parameter modification manager 730 may be configured as or otherwise support a means for modifying one or more parameters associated with the full duplex communications on the uplink SPS resources, the downlink SPS resources, or both, based on one or more instances of the uplink SPS resources at least partially overlapping in time with one or more instances of the downlink SPS resources. The full duplex communication manager 735 may be configured as or otherwise support a means for applying the one or more parameters, after modification, to transmission of uplink communications over the one or more instances of the uplink SPS resources, reception of downlink communications over the one or more instances of the downlink SPS resources, or both.

In some examples, to support modifying the one or more parameters, the priority level manager 740 may be configured as or otherwise support a means for determining a relative priority level between the one or more instances of the uplink SPS resources and the one or more instances of the downlink SPS resources. In some examples, to support modifying the one or more parameters, the priority level manager 740 may be configured as or otherwise support a means for modifying the one or more parameters so as to prioritize either the transmission of the uplink communications over the one or more instances of the uplink SPS resources or the reception of the downlink communications over the one or more instances of the downlink SPS resources based on the relative priority level.

In some examples, to support modifying the one or more parameters, the MCS manager 745 may be configured as or otherwise support a means for modifying at least one of a modulation and coding scheme parameter or a rank parameter for either the transmission of the uplink communications over the one or more instances of the uplink SPS resources or the reception of the downlink communications over the one or more instances of the downlink SPS resources.

In some examples, to support modifying the one or more parameters, the transmit power manager 750 may be configured as or otherwise support a means for modifying at least one of an uplink transmit power parameter, a frequency hopping parameter, or a precoder parameter for the transmission of the uplink communications over the one or more instances of the uplink SPS resources.

In some examples, to support applying the one or more parameters, the overlapping manager 755 may be configured as or otherwise support a means for applying the one or more parameters, after modification, to communications during additional non-overlapping instances of the uplink SPS resources and the downlink SPS resources. In some examples, to support applying the one or more parameters, the overlapping manager 755 may be configured as or otherwise support a means for applying the one or more parameters, after modification, to communications during only the one or more instances of the uplink SPS resources and the one or more instances of the downlink SPS resources.

In some examples, to support receiving the one or more messages, the scheduling manager 760 may be configured as or otherwise support a means for receiving a first message for the uplink SPS resources and a second message for the downlink SPS resources. In some examples, to support receiving the one or more messages, the scheduling manager 760 may be configured as or otherwise support a means for receiving a common message for the uplink SPS resources and the downlink SPS resources.

In some examples, the scheduling manager 760 may be configured as or otherwise support a means for determining, based on the common message, a downlink BWP identifier associated with the downlink SPS resources. In some examples, the scheduling manager 760 may be configured as or otherwise support a means for determining an uplink BWP identifier associated with the uplink SPS resources based on the downlink BWP identifier. In some examples, the scheduling manager 760 may be configured as or otherwise support a means for determining, based on the common message, an uplink BWP identifier associated with the uplink SPS resources. In some examples, the scheduling manager 760 may be configured as or otherwise support a means for determining a downlink BWP identifier associated with the downlink SPS resources based on the uplink BWP identifier.

In some examples, to support receiving the common message, the scheduling manager 760 may be configured as or otherwise support a means for receiving a common set of parameters for both the uplink SPS resources and the downlink SPS resources, separate sets of parameters for the uplink SPS resources and the downlink SPS resources, a first set of parameters for the downlink SPS resources with a first offset for determination of the uplink SPS resources, or a second set of parameters for the uplink SPS resources with a second offset for determination of the downlink SPS resources. In some examples, the common set of parameters, the separate sets of parameters, the first set of parameters, and the second set of parameters each include one or more of time domain resource allocation parameters, frequency domain resource allocation parameters, modulation and coding scheme parameters, rank parameters, or periodicity parameters.

In some examples, the scheduling manager 760 may be configured as or otherwise support a means for identifying an activation status of the downlink SPS resources and the uplink SPS resources, where the activation status is based on one of the downlink SPS resources being activated by the common message while the uplink SPS resources are dynamically activated, the uplink SPS resources being activated by the common message while the downlink SPS resources are dynamically activated, both the uplink SPS resources and the downlink SPS resources being activated by the common message, or both the uplink SPS resources and the downlink SPS resources being dynamically activated.

In some examples, the scheduling manager 760 may be configured as or otherwise support a means for receiving DCI separately activating the uplink SPS resources and the downlink SPS resources. In some examples, the scheduling manager 760 may be configured as or otherwise support a means for receiving DCI activating the uplink SPS resources. In some examples, the scheduling manager 760 may be configured as or otherwise support a means for determining that the downlink SPS resources are activated based on the DCI activating the uplink SPS resources.

In some examples, the scheduling manager 760 may be configured as or otherwise support a means for receiving DCI activating the downlink SPS resources. In some examples, the scheduling manager 760 may be configured as or otherwise support a means for determining that the uplink SPS resources are activated based on the DCI activating the downlink SPS resources. In some examples, the scheduling manager 760 may be configured as or otherwise support a means for transmitting a feedback message acknowledging receipt of DCI activating the uplink SPS resources and the downlink SPS resources, where the feedback message is at least one of a MAC-CE or an HARQ indicator.

In some examples, the scheduling manager 760 may be configured as or otherwise support a means for receiving DCI deactivating the uplink SPS resources. In some examples, the scheduling manager 760 may be configured as or otherwise support a means for determining that the downlink SPS resources are deactivated based on the DCI deactivating the uplink SPS resources.

In some examples, the scheduling manager 760 may be configured as or otherwise support a means for receiving DCI deactivating the downlink SPS resources. In some examples, the scheduling manager 760 may be configured as or otherwise support a means for determining that the uplink SPS resources are deactivated based on the DCI deactivating the downlink SPS resources.

In some examples, the scheduling manager 760 may be configured as or otherwise support a means for receiving DCI that includes separate indications for deactivating the downlink SPS resources and the uplink SPS resources.

Figure 8:
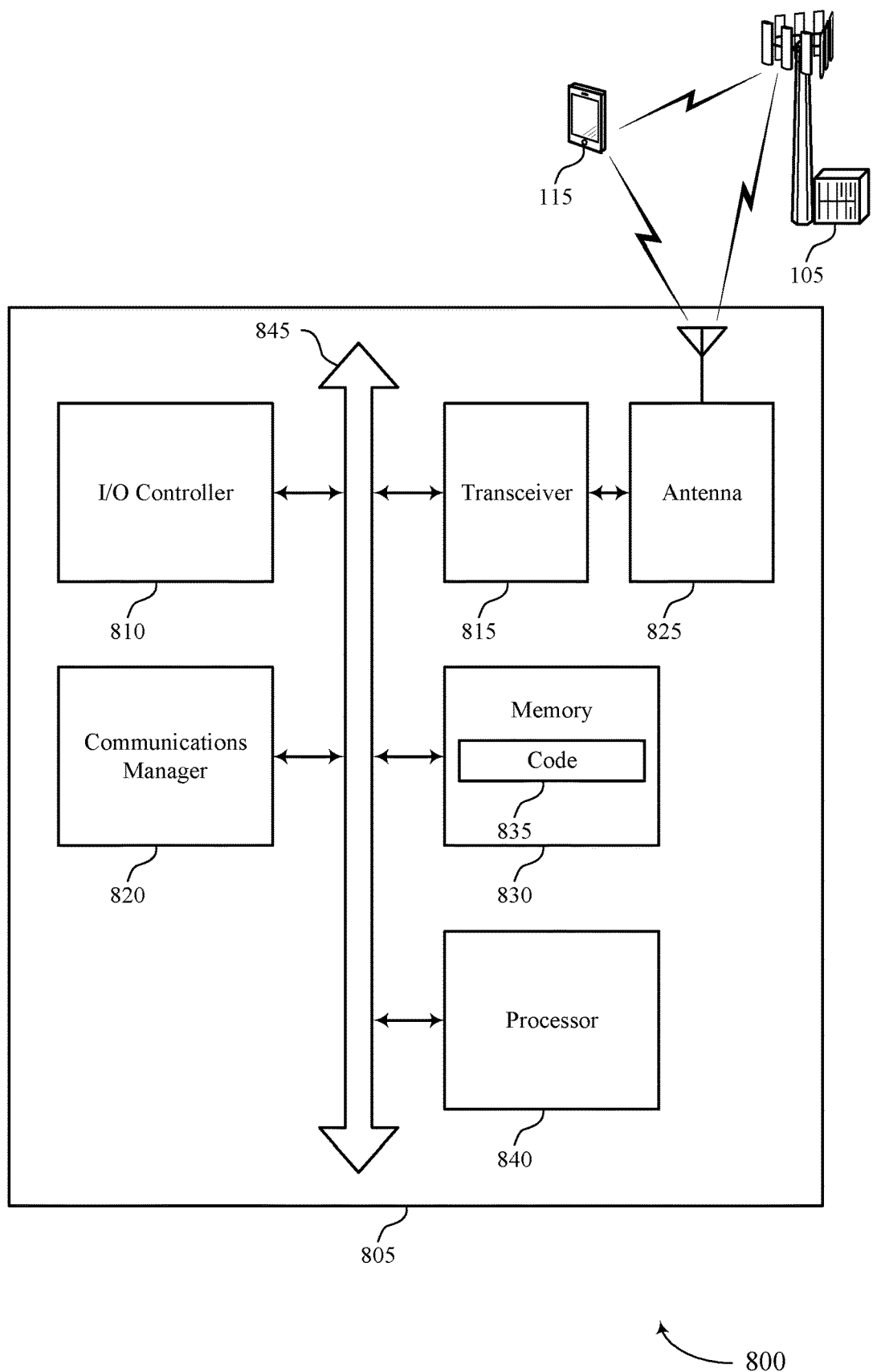
FIG. 8 shows a diagram of a system including a device that supports common downlink and uplink semi-persistent resource configuration for full duplex in accordance with aspects of the present disclosure.

FIG. 8 shows a diagram of a system 800 including a device 805 that supports common downlink and uplink semi-persistent resource configuration for full duplex in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting common downlink and uplink semi-persistent resource configuration for full duplex). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving one or more messages indicative of uplink SPS resources allocated to the UE and downlink SPS resources allocated to the UE, the uplink SPS resources and the downlink SPS resources being within a frequency band used for full duplex communications by the UE. The communications manager 820 may be configured as or otherwise support a means for modifying one or more parameters associated with the full duplex communications on the uplink SPS resources, the downlink SPS resources, or both, based on one or more instances of the uplink SPS resources at least partially overlapping in time with one or more instances of the downlink SPS resources. The communications manager 820 may be configured as or otherwise support a means for applying the one or more parameters, after modification, to transmission of uplink communications over the one or more instances of the uplink SPS resources, reception of downlink communications over the one or more instances of the downlink SPS resources, or both.

By including or configuring the communications manager 820 in accordance with examples as described herein, the device 805 may support techniques for improving full duplex communications using SPS resources when instance(s) of the SPS resources overlap in the time domain.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of common downlink and uplink semi-persistent resource configuration for full duplex as described herein, or the processor 840 and the memory 830 may be otherwise configured to perform or support such operations.

Figure 9:
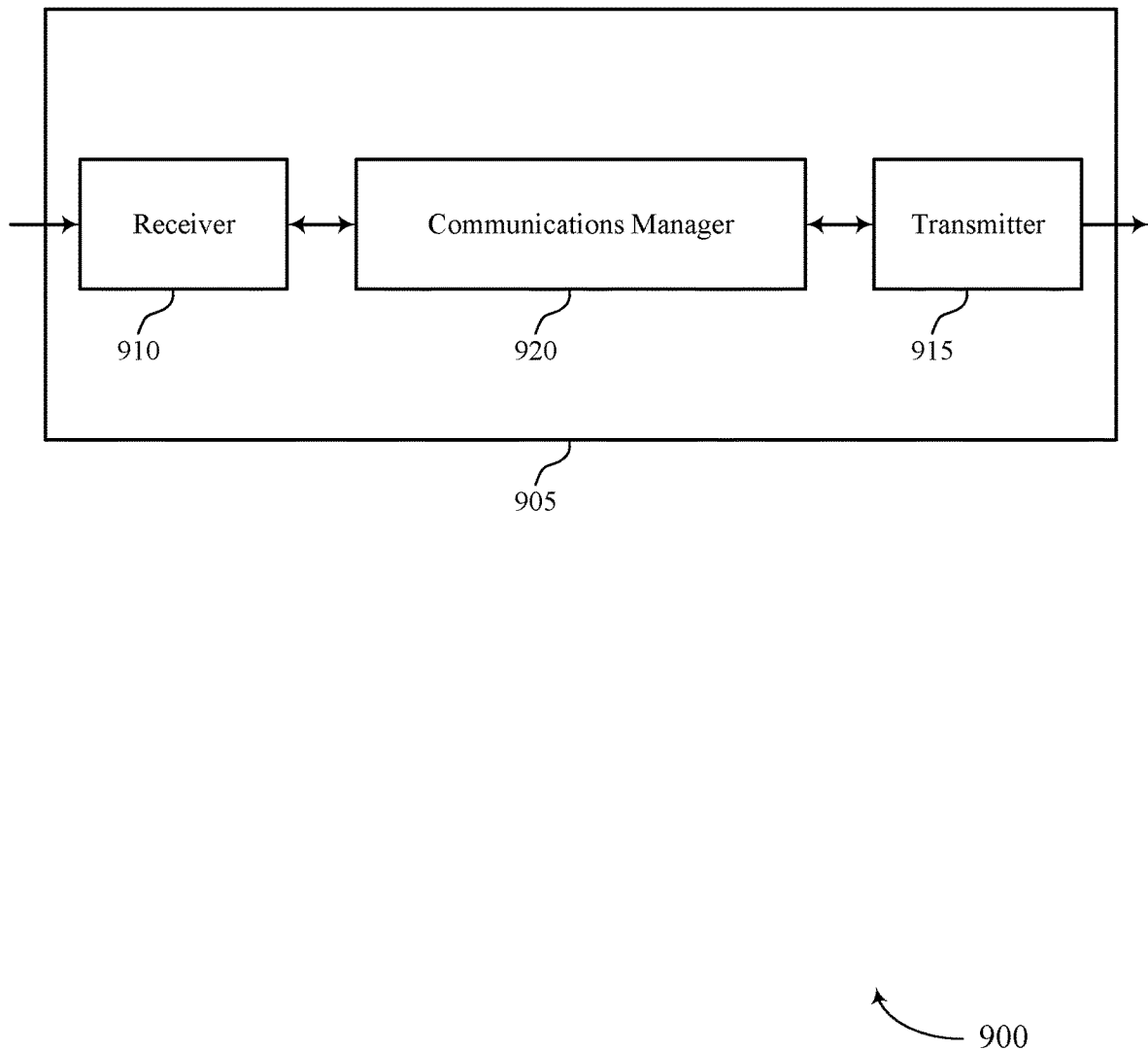
FIGS. 9 and 10 show block diagrams of devices that support common downlink and uplink semi-persistent resource configuration for full duplex in accordance with aspects of the present disclosure.

FIG. 9 shows a block diagram 900 of a device 905 that supports common downlink and uplink semi-persistent resource configuration for full duplex in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to common downlink and uplink semi-persistent resource configuration for full duplex). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to common downlink and uplink semi-persistent resource configuration for full duplex). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of common downlink and uplink semi-persistent resource configuration for full duplex as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for determining, for a UE, one or more parameters associated with full duplex communications on uplink SPS resources, downlink SPS resources, or both, based on one or more instances of the uplink SPS resources at least partially overlapping in time with one or more instances of the downlink SPS resources. The communications manager 920 may be configured as or otherwise support a means for transmitting one or more messages indicative of the uplink SPS resources allocated to the UE and the downlink SPS resources allocated to the UE, the uplink SPS resources and the downlink SPS resources being within a frequency band used for the full duplex communications with the UE. The communications manager 920 may be configured as or otherwise support a means for applying the one or more parameters to reception of uplink communications over the one or more instances of the uplink SPS resources, transmission of downlink communications over the one or more instances of the downlink SPS resources, or both.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improving full duplex communications using SPS resources when instance(s) of the SPS resources overlap in the time domain.

Figure 10:
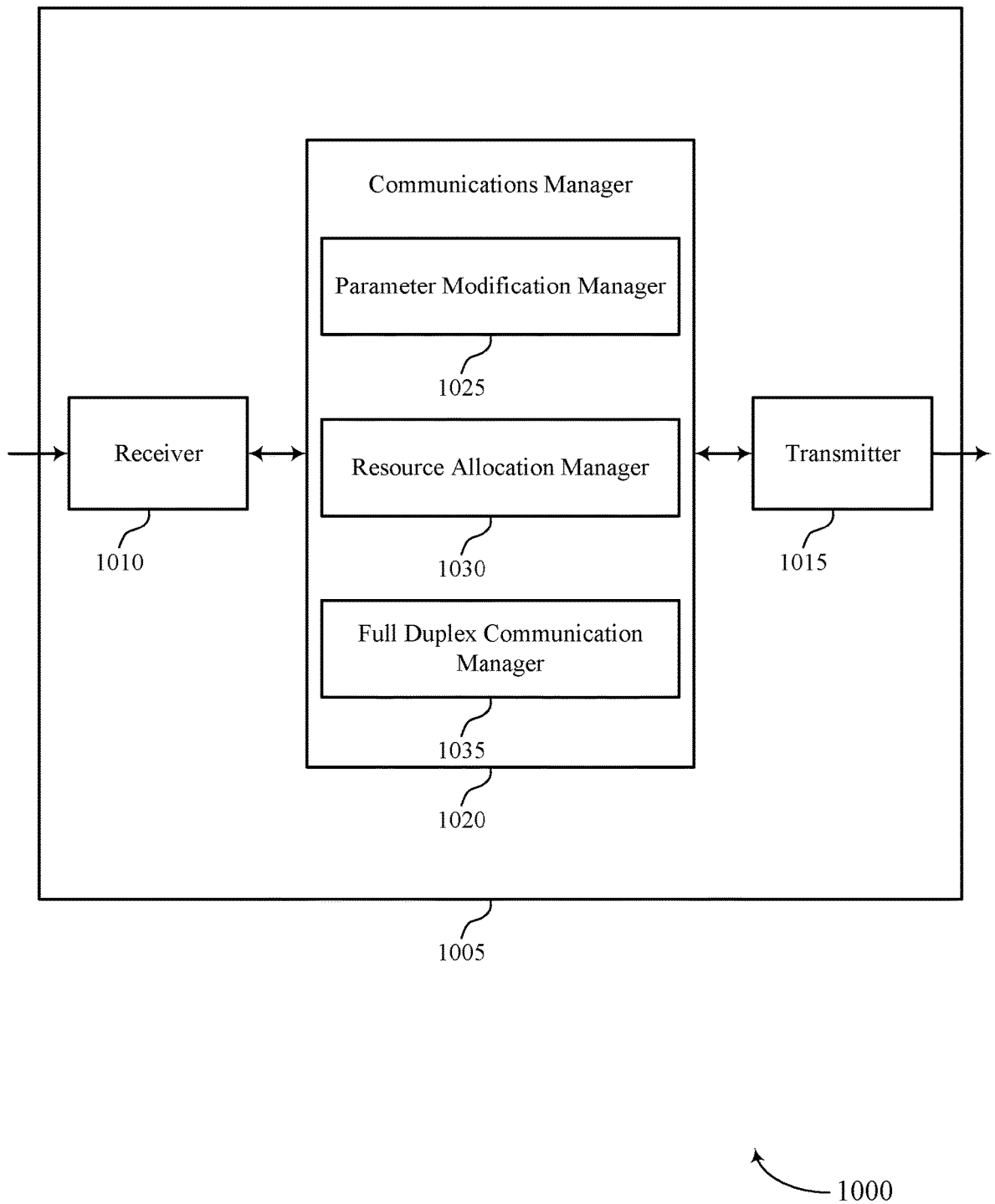

FIG. 10 shows a block diagram 1000 of a device 1005 that supports common downlink and uplink semi-persistent resource configuration for full duplex in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to common downlink and uplink semi-persistent resource configuration for full duplex). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to common downlink and uplink semi-persistent resource configuration for full duplex). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of common downlink and uplink semi-persistent resource configuration for full duplex as described herein. For example, the communications manager 1020 may include a parameter modification manager 1025, a resource allocation manager 1030, a full duplex communication manager 1035, or any combination thereof. The communications manager 1020 may be an example of aspects of a communications manager 920 as described herein. In some examples, the communications manager 1020, or various components thereof, be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The parameter modification manager 1025 may be configured as or otherwise support a means for determining, for a UE, one or more parameters associated with full duplex communications on uplink SPS resources, downlink SPS resources, or both, based on one or more instances of the uplink SPS resources at least partially overlapping in time with one or more instances of the downlink SPS resources. The resource allocation manager 1030 may be configured as or otherwise support a means for transmitting one or more messages indicative of the uplink SPS resources allocated to the UE and the downlink SPS resources allocated to the UE, the uplink SPS resources and the downlink SPS resources being within a frequency band used for the full duplex communications with the UE. The full duplex communication manager 1035 may be configured as or otherwise support a means for applying the one or more parameters to reception of uplink communications over the one or more instances of the uplink SPS resources, transmission of downlink communications over the one or more instances of the downlink SPS resources, or both.

Figure 11:
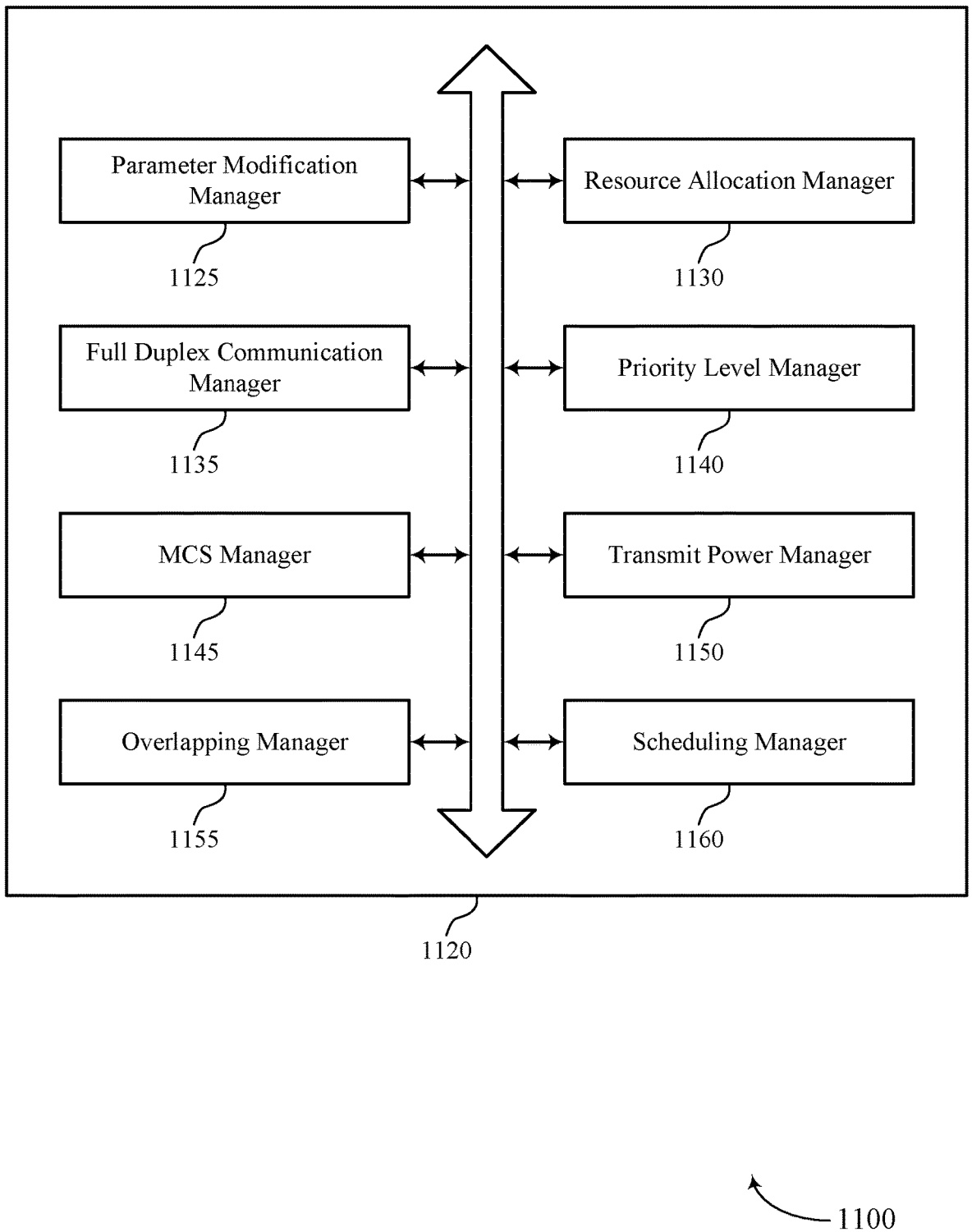
FIG. 11 shows a block diagram of a communications manager that supports common downlink and uplink semi-persistent resource configuration for full duplex in accordance with aspects of the present disclosure.

FIG. 11 shows a block diagram 1100 of a communications manager 1120 that supports common downlink and uplink semi-persistent resource configuration for full duplex in accordance with aspects of the present disclosure. The communications manager 1120 may be an example of aspects of a communications manager 920, a communications manager 1020, or both, as described herein. The communications manager 1120, or various components thereof, may be an example of means for performing various aspects of common downlink and uplink semi-persistent resource configuration for full duplex as described herein. For example, the communications manager 1120 may include a parameter modification manager 1125, a resource allocation manager 1130, a full duplex communication manager 1135, a priority level manager 1140, an MCS manager 1145, a transmit power manager 1150, an overlapping manager 1155, a scheduling manager 1160, or any combination thereof. Each of these components may communicate, directly or indirectly, with one another (e.g., via one or more buses).

The communications manager 1120 may support wireless communication at a base station in accordance with examples as disclosed herein. The parameter modification manager 1125 may be configured as or otherwise support a means for determining, for a UE, one or more parameters associated with full duplex communications on uplink SPS resources, downlink SPS resources, or both, based on one or more instances of the uplink SPS resources at least partially overlapping in time with one or more instances of the downlink SPS resources. The resource allocation manager 1130 may be configured as or otherwise support a means for transmitting one or more messages indicative of the uplink SPS resources allocated to the UE and the downlink SPS resources allocated to the UE, the uplink SPS resources and the downlink SPS resources being within a frequency band used for the full duplex communications with the UE. The full duplex communication manager 1135 may be configured as or otherwise support a means for applying the one or more parameters to reception of uplink communications over the one or more instances of the uplink SPS resources, transmission of downlink communications over the one or more instances of the downlink SPS resources, or both.

In some examples, to support determining the one or more parameters, the priority level manager 1140 may be configured as or otherwise support a means for determining a relative priority level between the one or more instances of the uplink SPS resources and the one or more instances of the downlink SPS resources. In some examples, to support determining the one or more parameters, the priority level manager 1140 may be configured as or otherwise support a means for determining the one or more parameters so as to prioritize either the transmission of the uplink communications over the one or more instances of the uplink SPS resources or the reception of the downlink communications over the one or more instances of the downlink SPS resources based on the relative priority level.

In some examples, to support determining the one or more parameters, the MCS manager 1145 may be configured as or otherwise support a means for determining at least one of a modulation and coding scheme parameter or a rank parameter for either the reception of the uplink communications over the one or more instances of the uplink SPS resources or the transmission of the downlink communications over the one or more instances of the downlink SPS resources.

In some examples, to support determining the one or more parameters, the transmit power manager 1150 may be configured as or otherwise support a means for determining at least one of an uplink transmit power parameter, a frequency hopping parameter, or a precoder parameter for the reception of the uplink communications over the one or more instances of the uplink SPS resources.

In some examples, to support determining the one or more parameters, the overlapping manager 1155 may be configured as or otherwise support a means for applying the one or more parameters to communications during additional non-overlapping instances of the uplink SPS resources and the downlink SPS resources. In some examples, to support determining the one or more parameters, the overlapping manager 1155 may be configured as or otherwise support a means for applying the one or more parameters to communications during only the one or more instances of the uplink SPS resources and the one or more instances of the downlink SPS resources.

In some examples, to support transmitting the one or more messages, the scheduling manager 1160 may be configured as or otherwise support a means for transmitting a first message for the uplink SPS resources and a second message for the downlink SPS resources. In some examples, to support transmitting the one or more messages, the scheduling manager 1160 may be configured as or otherwise support a means for transmitting a common message for the uplink SPS resources and the downlink SPS resources.

In some examples, the scheduling manager 1160 may be configured as or otherwise support a means for configuring the common message to indicate a downlink BWP identifier associated with the downlink SPS resources, where an uplink BWP identifier associated with the uplink SPS resources is associated determined based on the downlink BWP identifier. In some examples, the scheduling manager 1160 may be configured as or otherwise support a means for configuring the common message to indicate an uplink BWP identifier associated with the uplink SPS resources, where a downlink BWP identifier associated with the downlink SPS resources is determined based on the uplink BWP identifier.

In some examples, to support transmitting the common message, the scheduling manager 1160 may be configured as or otherwise support a means for transmitting a common set of parameters for both the uplink SPS resources and the downlink SPS resources, separate sets of parameters for the uplink SPS resources and the downlink SPS resources, a first set of parameters for the downlink SPS resources with a first offset for determination of the uplink SPS resources, or a second set of parameters for the uplink SPS resources with a second offset for determination of the downlink SPS resources. In some examples, the common set of parameters, the separate sets of parameters, the first set of parameters, and the second set of parameters each include one or more of time domain resource allocation parameters, frequency domain resource allocation parameters, modulation and coding scheme parameters, rank parameters, or periodicity parameters.

In some examples, the scheduling manager 1160 may be configured as or otherwise support a means for identifying an activation status of the downlink SPS resources and the uplink SPS resources, where the activation status is based on one of the downlink SPS resources being activated by the common message while the uplink SPS resources are dynamically activated, the uplink SPS resources being activated by the common message while the downlink SPS resources are dynamically activated, both the uplink SPS resources and the downlink SPS resources being activated by the common message, or both the uplink SPS resources and the downlink SPS resources being dynamically activated.

In some examples, the scheduling manager 1160 may be configured as or otherwise support a means for transmitting DCI separately activating the uplink SPS resources and the downlink SPS resources. In some examples, the scheduling manager 1160 may be configured as or otherwise support a means for transmitting DCI activating the uplink SPS resources, where the downlink SPS resources are activated based on the DCI activating the uplink SPS resources. In some examples, the scheduling manager 1160 may be configured as or otherwise support a means for transmitting DCI activating the downlink SPS resources, where the uplink SPS resources are activated based on the DCI activating the downlink SPS resources.

In some examples, the scheduling manager 1160 may be configured as or otherwise support a means for receiving a feedback message acknowledging receipt of DCI activating the uplink SPS resources and the downlink SPS resources, where the feedback message is at least one of a MAC-CE or an HARQ indicator. In some examples, the scheduling manager 1160 may be configured as or otherwise support a means for transmitting DCI deactivating the uplink SPS resources, where the downlink SPS resources are deactivated based on the DCI deactivating the uplink SPS resources.

In some examples, the scheduling manager 1160 may be configured as or otherwise support a means for transmitting DCI deactivating the downlink SPS resources, where the uplink SPS resources are deactivated based on the DCI deactivating the downlink SPS resources. In some examples, the scheduling manager 1160 may be configured as or otherwise support a means for transmitting DCI that includes separate indications for deactivating the downlink SPS resources and the uplink SPS resources.

Figure 12:
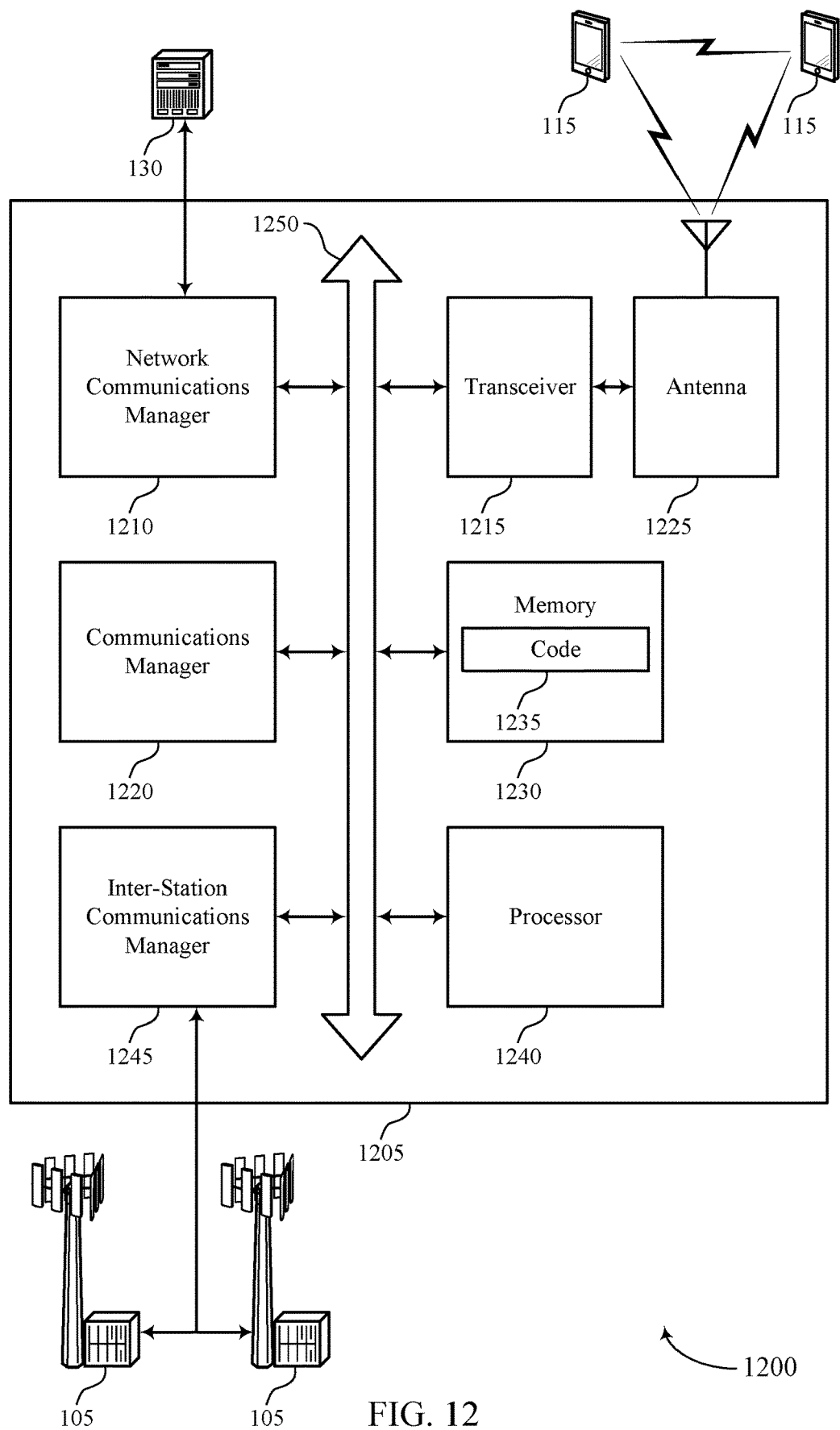
FIG. 12 shows a diagram of a system including a device that supports common downlink and uplink semi-persistent resource configuration for full duplex in accordance with aspects of the present disclosure.

FIG. 12 shows a diagram of a system 1200 including a device 1205 that supports common downlink and uplink semi-persistent resource configuration for full duplex in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting common downlink and uplink semi-persistent resource configuration for full duplex). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for determining, for a UE, one or more parameters associated with full duplex communications on uplink SPS resources, downlink SPS resources, or both, based on one or more instances of the uplink SPS resources at least partially overlapping in time with one or more instances of the downlink SPS resources. The communications manager 1220 may be configured as or otherwise support a means for transmitting one or more messages indicative of the uplink SPS resources allocated to the UE and the downlink SPS resources allocated to the UE, the uplink SPS resources and the downlink SPS resources being within a frequency band used for the full duplex communications with the UE. The communications manager 1220 may be configured as or otherwise support a means for applying the one or more parameters to reception of uplink communications over the one or more instances of the uplink SPS resources, transmission of downlink communications over the one or more instances of the downlink SPS resources, or both.

By including or configuring the communications manager 1220 in accordance with examples as described herein, the device 1205 may support techniques for improving full duplex communications using SPS resources when instance(s) of the SPS resources overlap in the time domain.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of common downlink and uplink semi-persistent resource configuration for full duplex as described herein, or the processor 1240 and the memory 1230 may be otherwise configured to perform or support such operations.

Figure 13:
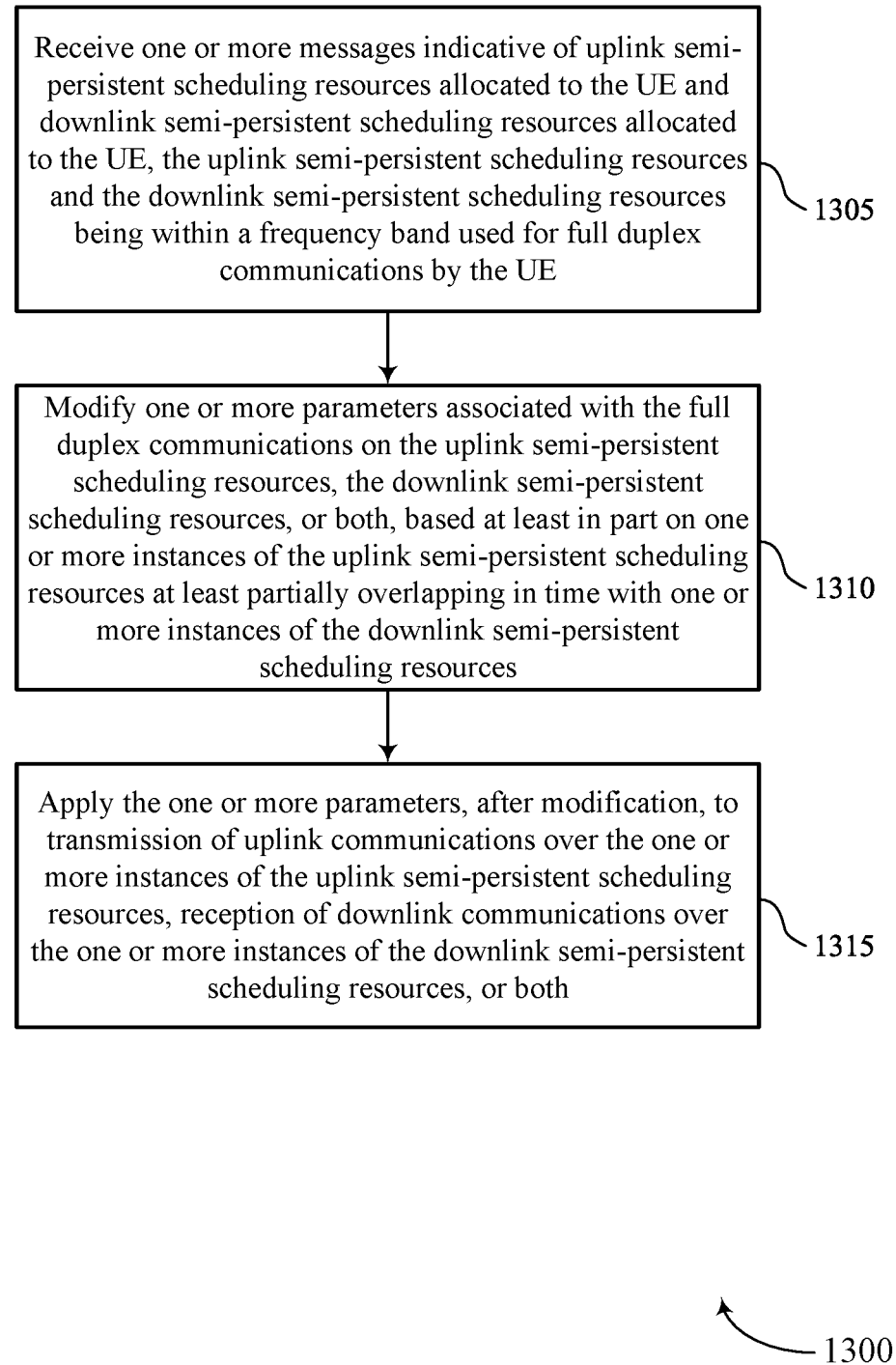
FIGS. 13 through 17 show flowcharts illustrating methods that support common downlink and uplink semi-persistent resource configuration for full duplex in accordance with aspects of the present disclosure.

FIG. 13 shows a flowchart illustrating a method 1300 that supports common downlink and uplink semi-persistent resource configuration for full duplex in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving one or more messages indicative of uplink SPS resources allocated to the UE and downlink SPS resources allocated to the UE, the uplink SPS resources and the downlink SPS resources being within a frequency band used for full duplex communications by the UE. The operations of 1305 may be performed in accordance with examples as disclosed herein. In some examples, aspects of the operations of 1305 may be performed by a resource allocation manager 725 as described with reference to FIG. 7.

At 1310, the method may include modifying one or more parameters associated with the full duplex communications on the uplink SPS resources, the downlink SPS resources, or both, based on one or more instances of the uplink SPS resources at least partially overlapping in time with one or more instances of the downlink SPS resources. The operations of 1310 may be performed in accordance with examples as disclosed herein. In some examples, aspects of the operations of 1310 may be performed by a parameter modification manager 730 as described with reference to FIG. 7.

At 1315, the method may include applying the one or more parameters, after modification, to transmission of uplink communications over the one or more instances of the uplink SPS resources, reception of downlink communications over the one or more instances of the downlink SPS resources, or both. The operations of 1315 may be performed in accordance with examples as disclosed herein. In some examples, aspects of the operations of 1315 may be performed by a full duplex communication manager 735 as described with reference to FIG. 7.

Figure 14:
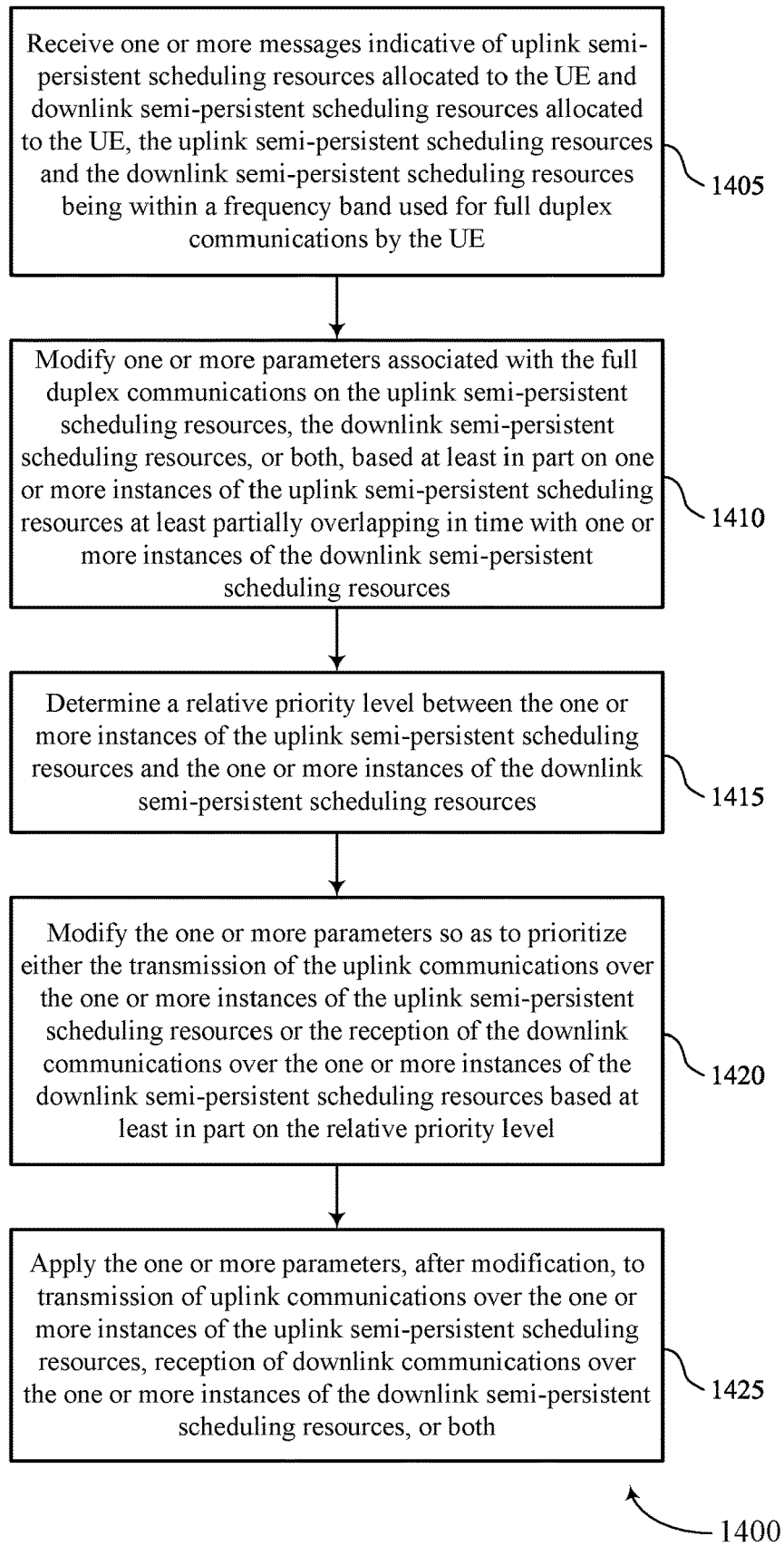

FIG. 14 shows a flowchart illustrating a method 1400 that supports common downlink and uplink semi-persistent resource configuration for full duplex in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving one or more messages indicative of uplink SPS resources allocated to the UE and downlink SPS resources allocated to the UE, the uplink SPS resources and the downlink SPS resources being within a frequency band used for full duplex communications by the UE. The operations of 1405 may be performed in accordance with examples as disclosed herein. In some examples, aspects of the operations of 1405 may be performed by a resource allocation manager 725 as described with reference to FIG. 7.

At 1410, the method may include modifying one or more parameters associated with the full duplex communications on the uplink SPS resources, the downlink SPS resources, or both, based on one or more instances of the uplink SPS resources at least partially overlapping in time with one or more instances of the downlink SPS resources. The operations of 1410 may be performed in accordance with examples as disclosed herein. In some examples, aspects of the operations of 1410 may be performed by a parameter modification manager 730 as described with reference to FIG. 7.

At 1415, the method may include determining a relative priority level between the one or more instances of the uplink SPS resources and the one or more instances of the downlink SPS resources. The operations of 1415 may be performed in accordance with examples as disclosed herein. In some examples, aspects of the operations of 1415 may be performed by a priority level manager 740 as described with reference to FIG. 7.

At 1420, the method may include modifying the one or more parameters so as to prioritize either the transmission of the uplink communications over the one or more instances of the uplink SPS resources or the reception of the downlink communications over the one or more instances of the downlink SPS resources based on the relative priority level. The operations of 1420 may be performed in accordance with examples as disclosed herein. In some examples, aspects of the operations of 1420 may be performed by a priority level manager 740 as described with reference to FIG. 7.

At 1425, the method may include applying the one or more parameters, after modification, to transmission of uplink communications over the one or more instances of the uplink SPS resources, reception of downlink communications over the one or more instances of the downlink SPS resources, or both. The operations of 1425 may be performed in accordance with examples as disclosed herein. In some examples, aspects of the operations of 1425 may be performed by a full duplex communication manager 735 as described with reference to FIG. 7.

Figure 15:
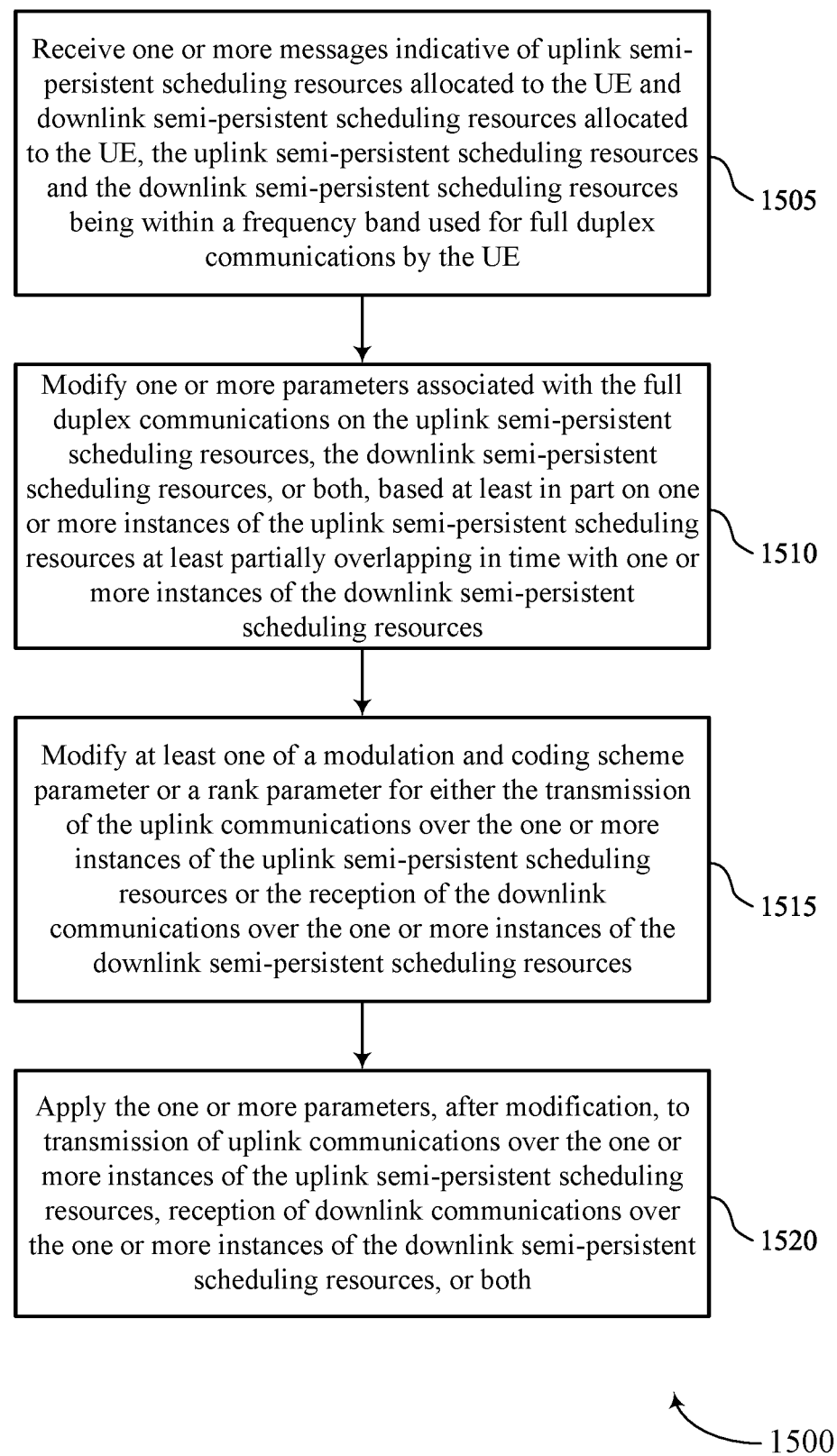

FIG. 15 shows a flowchart illustrating a method 1500 that supports common downlink and uplink semi-persistent resource configuration for full duplex in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving one or more messages indicative of uplink SPS resources allocated to the UE and downlink SPS resources allocated to the UE, the uplink SPS resources and the downlink SPS resources being within a frequency band used for full duplex communications by the UE. The operations of 1505 may be performed in accordance with examples as disclosed herein. In some examples, aspects of the operations of 1505 may be performed by a resource allocation manager 725 as described with reference to FIG. 7.

At 1510, the method may include modifying one or more parameters associated with the full duplex communications on the uplink SPS resources, the downlink SPS resources, or both, based on one or more instances of the uplink SPS resources at least partially overlapping in time with one or more instances of the downlink SPS resources. The operations of 1510 may be performed in accordance with examples as disclosed herein. In some examples, aspects of the operations of 1510 may be performed by a parameter modification manager 730 as described with reference to FIG. 7.

At 1515, the method may include modifying at least one of a modulation and coding scheme parameter or a rank parameter for either the transmission of the uplink communications over the one or more instances of the uplink SPS resources or the reception of the downlink communications over the one or more instances of the downlink SPS resources. The operations of 1515 may be performed in accordance with examples as disclosed herein. In some examples, aspects of the operations of 1515 may be performed by an MCS manager 745 as described with reference to FIG. 7.

At 1520, the method may include applying the one or more parameters, after modification, to transmission of uplink communications over the one or more instances of the uplink SPS resources, reception of downlink communications over the one or more instances of the downlink SPS resources, or both. The operations of 1520 may be performed in accordance with examples as disclosed herein. In some examples, aspects of the operations of 1520 may be performed by a full duplex communication manager 735 as described with reference to FIG. 7.

Figure 16:
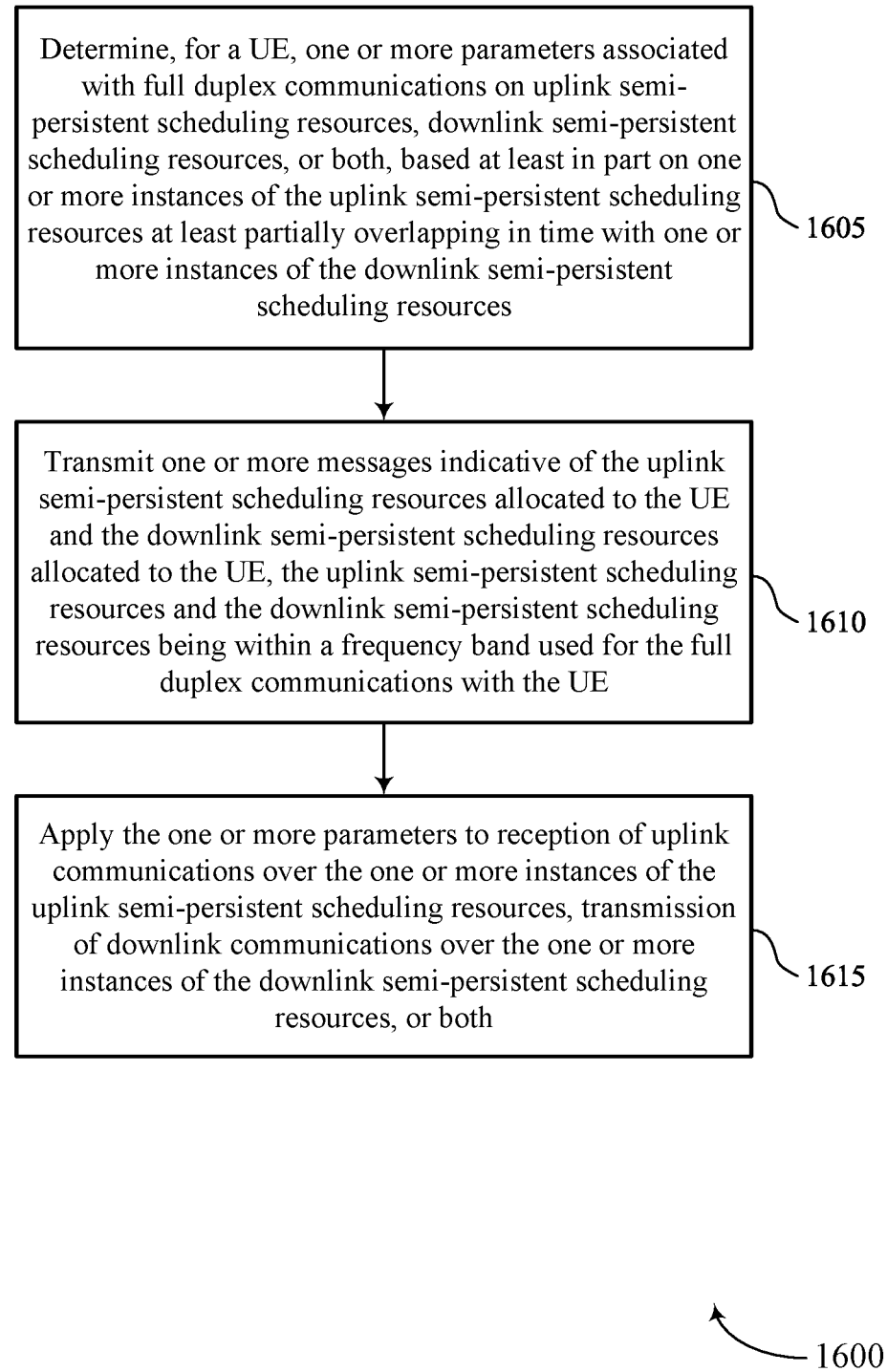

FIG. 16 shows a flowchart illustrating a method 1600 that supports common downlink and uplink semi-persistent resource configuration for full duplex in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include determining, for a UE, one or more parameters associated with full duplex communications on uplink SPS resources, downlink SPS resources, or both, based on one or more instances of the uplink SPS resources at least partially overlapping in time with one or more instances of the downlink SPS resources. The operations of 1605 may be performed in accordance with examples as disclosed herein. In some examples, aspects of the operations of 1605 may be performed by a parameter modification manager 1125 as described with reference to FIG. 11.

At 1610, the method may include transmitting one or more messages indicative of the uplink SPS resources allocated to the UE and the downlink SPS resources allocated to the UE, the uplink SPS resources and the downlink SPS resources being within a frequency band used for the full duplex communications with the UE. The operations of 1610 may be performed in accordance with examples as disclosed herein. In some examples, aspects of the operations of 1610 may be performed by a resource allocation manager 1130 as described with reference to FIG. 11.

At 1615, the method may include applying the one or more parameters to reception of uplink communications over the one or more instances of the uplink SPS resources, transmission of downlink communications over the one or more instances of the downlink SPS resources, or both. The operations of 1615 may be performed in accordance with examples as disclosed herein. In some examples, aspects of the operations of 1615 may be performed by a full duplex communication manager 1135 as described with reference to FIG. 11.

Figure 17:
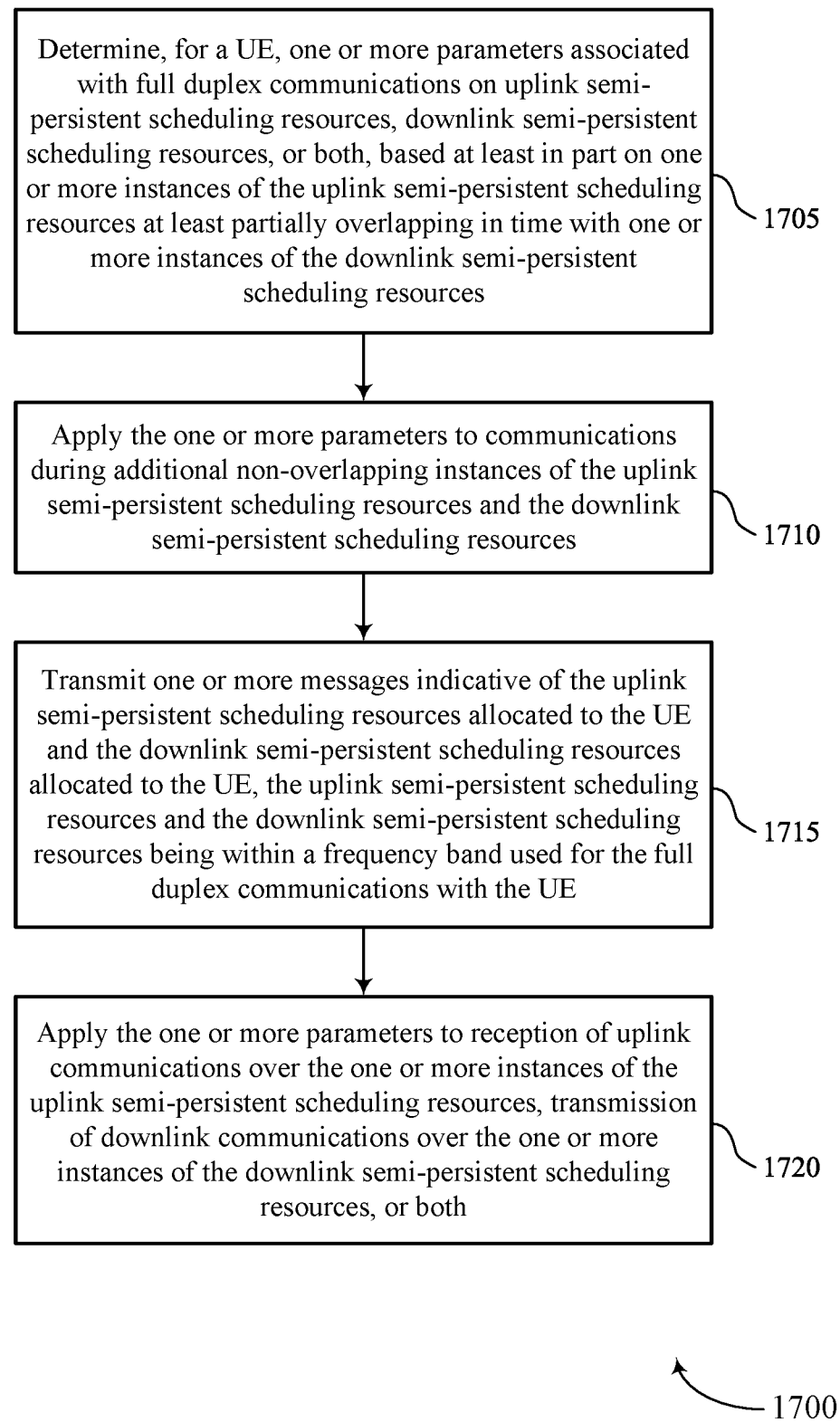

FIG. 17 shows a flowchart illustrating a method 1700 that supports common downlink and uplink semi-persistent resource configuration for full duplex in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include determining, for a UE, one or more parameters associated with full duplex communications on uplink SPS resources, downlink SPS resources, or both, based on one or more instances of the uplink SPS resources at least partially overlapping in time with one or more instances of the downlink SPS resources. The operations of 1705 may be performed in accordance with examples as disclosed herein. In some examples, aspects of the operations of 1705 may be performed by a parameter modification manager 1125 as described with reference to FIG. 11.

At 1710, the method may include applying the one or more parameters to communications during additional non-overlapping instances of the uplink SPS resources and the downlink SPS resources. The operations of 1710 may be performed in accordance with examples as disclosed herein. In some examples, aspects of the operations of 1710 may be performed by an overlapping manager 1155 as described with reference to FIG. 11.

At 1715, the method may include transmitting one or more messages indicative of the uplink SPS resources allocated to the UE and the downlink SPS resources allocated to the UE, the uplink SPS resources and the downlink SPS resources being within a frequency band used for the full duplex communications with the UE. The operations of 1715 may be performed in accordance with examples as disclosed herein. In some examples, aspects of the operations of 1715 may be performed by a resource allocation manager 1130 as described with reference to FIG. 11.

At 1720, the method may include applying the one or more parameters to reception of uplink communications over the one or more instances of the uplink SPS resources, transmission of downlink communications over the one or more instances of the downlink SPS resources, or both. The operations of 1720 may be performed in accordance with examples as disclosed herein. In some examples, aspects of the operations of 1720 may be performed by a full duplex communication manager 1135 as described with reference to FIG. 11.

The following provides an overview of aspects of the present disclosure:

Aspect 1: A method for wireless communication at a UE, comprising: receiving one or more messages indicative of uplink SPS resources allocated to the UE and downlink SPS resources allocated to the UE, the uplink SPS resources and the downlink SPS resources being within a frequency band used for full duplex communications by the UE; modifying one or more parameters associated with the full duplex communications on the uplink resources, the downlink SPS resources, or both, based at least in part on one or more instances of the uplink SPS resources at least partially overlapping in time with one or more instances of the downlink SPS resources; and applying the one or more parameters, after modification, to transmission of uplink communications over the one or more instances of the uplink SPS resources, reception of downlink communications over the one or more instances of the downlink SPS resources, or both.

Aspect 2: The method of aspect 1, wherein modifying the one or more parameters further comprises: determining a relative priority level between the one or more instances of the uplink SPS resources and the one or more instances of the downlink SPS resources; and modifying the one or more parameters so as to prioritize either the transmission of the uplink communications over the one or more instances of the uplink SPS resources or the reception of the downlink communications over the one or more instances of the downlink SPS resources based at least in part on the relative priority level.

Aspect 3: The method of any of aspects 1 through 2, wherein modifying the one or more parameters further comprises: modifying at least one of a modulation and coding scheme parameter or a rank parameter for either the transmission of the uplink communications over the one or more instances of the uplink SPS resources or the reception of the downlink communications over the one or more instances of the downlink SPS resources.

Aspect 4: The method of any of aspects 1 through 3, wherein modifying the one or more parameters further comprises: modifying at least one of an uplink transmit power parameter, a frequency hopping parameter, or a precoder parameter for the transmission of the uplink communications over the one or more instances of the uplink SPS resources.

Aspect 5: The method of any of aspects 1 through 4, wherein applying the one or more parameters further comprises: applying the one or more parameters, after modification, to communications during additional non-overlapping instances of the uplink SPS resources and the downlink SPS resources.

Aspect 6: The method of any of aspects 1 through 5, wherein applying the one or more parameters further comprises: applying the one or more parameters, after modification, to communications during only the one or more instances of the uplink SPS resources and the one or more instances of the downlink SPS resources.

Aspect 7: The method of any of aspects 1 through 6, wherein receiving the one or more messages comprises: receiving a first message for the uplink SPS resources and a second message for the downlink SPS resources.

Aspect 8: The method of any of aspects 1 through 7, wherein receiving the one or more messages comprises: receiving a common message for the uplink SPS resources and the downlink SPS resources.

Aspect 9: The method of aspect 8, further comprising: determining, based at least in part on the common message, a downlink BWP identifier associated with the downlink SPS resources; and determining an uplink BWP identifier associated with the uplink SPS resources based at least in part on the downlink BWP identifier.

Aspect 10: The method of any of aspects 8 through 9, further comprising: determining, based at least in part on the common message, an uplink BWP identifier associated with the uplink SPS resources; and determining a downlink BWP identifier associated with the downlink SPS resources based at least in part on the uplink BWP identifier.

Aspect 11: The method of any of aspects 8 through 10, wherein receiving the common message further comprises: receiving a common set of parameters for both the uplink SPS resources and the downlink SPS resources, separate sets of parameters for the uplink SPS resources and the downlink SPS resources, a first set of parameters for the downlink SPS resources with a first offset for determination of the uplink SPS resources, or a second set of parameters for the uplink SPS resources with a second offset for determination of the downlink SPS resources.

Aspect 12: The method of aspect 11, wherein the common set of parameters, the separate sets of parameters, the first set of parameters, and the second set of parameters each include one or more of TDRA parameters, FDRA parameters, MCS parameters, rank parameters, or periodicity parameters.

Aspect 13: The method of any of aspects 8 through 12, further comprising: identifying an activation status of the downlink SPS resources and the uplink SPS resources, wherein the activation status is based on one of the downlink SPS resources being activated by the common message while the uplink SPS resources are dynamically activated, the uplink SPS resources being activated by the common message while the downlink SPS resources are dynamically activated, both the uplink SPS resources and the downlink SPS resources being activated by the common message, or both the uplink SPS resources and the downlink SPS resources being dynamically activated.

Aspect 14: The method of any of aspects 8 through 13, further comprising: receiving DCI separately activating the uplink SPS resources and the downlink SPS resources.

Aspect 15: The method of any of aspects 8 through 14, further comprising: receiving DCI activating the uplink SPS resources; and determining that the downlink SPS resources are activated based at least in part on the DCI activating the uplink SPS resources.

Aspect 16: The method of any of aspects 8 through 15, further comprising: receiving DCI activating the downlink SPS resources; and determining that the uplink SPS resources are activated based at least in part on the DCI activating the downlink SPS resources.

Aspect 17: The method of any of aspects 8 through 16, further comprising: transmitting a feedback message acknowledging receipt of DCI activating the uplink SPS resources and the downlink SPS resources, wherein the feedback message is at least one of a MAC-CE or an HARQ indicator.

Aspect 18: The method of any of aspects 8 through 17, further comprising: receiving DCI deactivating the uplink SPS resources; and determining that the downlink SPS resources are deactivated based at least in part on the DCI deactivating the uplink SPS resources.

Aspect 19: The method of any of aspects 8 through 18, further comprising: receiving DCI deactivating the downlink SPS resources; and determining that the uplink SPS resources are deactivated based at least in part on the DCI deactivating the downlink SPS resources.

Aspect 20: The method of any of aspects 8 through 19, further comprising: receiving DCI that includes separate indications for deactivating the downlink SPS resources and the uplink SPS resources.

Aspect 21: A method for wireless communication at a base station, comprising: determining, for a UE, one or more parameters associated with full duplex communications on uplink SPS resources, downlink SPS resources, or both, based at least in part on one or more instances of the uplink SPS resources at least partially overlapping in time with one or more instances of the downlink SPS resources; transmitting one or more messages indicative of the uplink SPS resources allocated to the UE and the downlink SPS resources allocated to the UE, the uplink SPS resources and the downlink SPS resources being within a frequency band used for the full duplex communications with the UE; and applying the one or more parameters to reception of uplink communications over the one or more instances of the uplink SPS resources, transmission of downlink communications over the one or more instances of the downlink SPS resources, or both.

Aspect 22: The method of aspect 21, wherein determining the one or more parameters further comprises: determining a relative priority level between the one or more instances of the uplink SPS resources and the one or more instances of the downlink SPS resources; and determining the one or more parameters so as to prioritize either the transmission of the uplink communications over the one or more instances of the uplink SPS resources or the reception of the downlink communications over the one or more instances of the downlink SPS resources based at least in part on the relative priority level.

Aspect 23: The method of any of aspects 21 through 22, wherein determining the one or more parameters further comprises: determining at least one of a modulation and coding scheme parameter or a rank parameter for either the reception of the uplink communications over the one or more instances of the uplink SPS resources or the transmission of the downlink communications over the one or more instances of the downlink SPS resources.

Aspect 24: The method of any of aspects 21 through 23, wherein determining the one or more parameters further comprises: determining at least one of an uplink transmit power parameter, a frequency hopping parameter, or a precoder parameter for the reception of the uplink communications over the one or more instances of the uplink SPS resources.

Aspect 25: The method of any of aspects 21 through 24, wherein determining the one or more parameters further comprises: applying the one or more parameters to communications during additional non-overlapping instances of the uplink SPS resources and the downlink SPS resources.

Aspect 26: The method of any of aspects 21 through 25, wherein determining the one or more parameters further comprises: applying the one or more parameters to communications during only the one or more instances of the uplink SPS resources and the one or more instances of the downlink SPS resources.

Aspect 27: The method of any of aspects 21 through 26, wherein transmitting the one or more messages comprises: transmitting a first message for the uplink SPS resources and a second message for the downlink SPS resources.

Aspect 28: The method of any of aspects 21 through 27, wherein transmitting the one or more messages comprises: transmitting a common message for the uplink SPS resources and the downlink SPS resources.

Aspect 29: The method of aspect 28, further comprising: configuring the common message to indicate a downlink BWP identifier associated with the downlink SPS resources, wherein an uplink BWP identifier associated with the uplink SPS resources is associated determined based at least in part on the downlink BWP identifier.

Aspect 30: The method of any of aspects 28 through 29, further comprising: configuring the common message to indicate an uplink BWP identifier associated with the uplink SPS resources, wherein a downlink BWP identifier associated with the downlink SPS resources is determined based at least in part on the uplink BWP identifier.

Aspect 31: The method of any of aspects 28 through 30, wherein transmitting the common message further comprises: transmitting a common set of parameters for both the uplink SPS resources and the downlink SPS resources, separate sets of parameters for the uplink SPS resources and the downlink SPS resources, a first set of parameters for the downlink SPS resources with a first offset for determination of the uplink SPS resources, or a second set of parameters for the uplink SPS resources with a second offset for determination of the downlink SPS resources.

Aspect 32: The method of aspect 31, wherein the common set of parameters, the separate sets of parameters, the first set of parameters, and the second set of parameters each include one or more of TDRA parameters, FDRA parameters, MCS parameters, rank parameters, or periodicity parameters.

Aspect 33: The method of any of aspects 28 through 32, further comprising: identifying an activation status of the downlink SPS resources and the uplink SPS resources, wherein the activation status is based on one of the downlink SPS resources being activated by the common message while the uplink SPS resources are dynamically activated, the uplink SPS resources being activated by the common message while the downlink SPS resources are dynamically activated, both the uplink SPS resources and the downlink SPS resources being activated by the common message, or both the uplink SPS resources and the downlink SPS resources being dynamically activated.

Aspect 34: The method of any of aspects 28 through 33, further comprising: transmitting DCI separately activating the uplink SPS resources and the downlink SPS resources.

Aspect 35: The method of any of aspects 28 through 34, further comprising: transmitting DCI activating the uplink SPS resources, wherein the downlink SPS resources are activated based at least in part on the DCI activating the uplink SPS resources.

Aspect 36: The method of any of aspects 28 through 35, further comprising: transmitting DCI activating the downlink SPS resources, wherein the uplink SPS resources are activated based at least in part on the DCI activating the downlink SPS resources.

Aspect 37: The method of any of aspects 28 through 36, further comprising: receiving a feedback message acknowledging receipt of DCI activating the uplink SPS resources and the downlink SPS resources, wherein the feedback message is at least one of a MAC-CE or an HARQ indicator.

Aspect 38: The method of any of aspects 28 through 37, further comprising: transmitting DCI deactivating the uplink SPS resources, wherein the downlink SPS resources are deactivated based at least in part on the DCI deactivating the uplink SPS resources.

Aspect 39: The method of any of aspects 28 through 38, further comprising: transmitting DCI deactivating the downlink SPS resources, wherein the uplink SPS resources are deactivated based at least in part on the DCI deactivating the downlink SPS resources.

Aspect 40: The method of any of aspects 28 through 39, further comprising: transmitting DCI that includes separate indications for deactivating the downlink SPS resources and the uplink SPS resources.

Aspect 41: An apparatus for wireless communication at a UE, comprising a processor; memory coupled with the processor; and instructions stored in the memory and executable by the processor to cause the apparatus to perform a method of any of aspects 1 through 20.

Aspect 42: An apparatus for wireless communication at a UE, comprising at least one means for performing a method of any of aspects 1 through 20.

Aspect 43: A non-transitory computer-readable medium storing code for wireless communication at a UE, the code comprising instructions executable by a processor to perform a method of any of aspects 1 through 20.

Aspect 44: An apparatus for wireless communication at a base station, comprising a processor; memory coupled with the processor; and instructions stored in the memory and executable by the processor to cause the apparatus to perform a method of any of aspects 21 through 40.

Aspect 45: An apparatus for wireless communication at a base station, comprising at least one means for performing a method of any of aspects 21 through 40.

Aspect 46: A non-transitory computer-readable medium storing code for wireless communication at a base station, the code comprising instructions executable by a processor to perform a method of any of aspects 21 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving one or more messages indicative of uplink semi-persistent scheduling resources allocated to the UE and downlink semi-persistent scheduling resources allocated to the UE, the uplink semi-persistent scheduling resources and the downlink semi-persistent scheduling resources being within a frequency band used for full duplex communications by the UE;
    modifying one or more parameters associated with the full duplex communications on the uplink semi-persistent scheduling resources, the downlink semi-persistent scheduling resources, or both, based at least in part on one or more instances of the uplink semi-persistent scheduling resources at least partially overlapping in time with one or more instances of the downlink semi-persistent scheduling resources; and
    applying the one or more parameters, after modification, to transmission of uplink communications over the one or more instances of the uplink semi-persistent scheduling resources, reception of downlink communications over the one or more instances of the downlink semi-persistent scheduling resources, or both.

2. The method of claim 1, wherein modifying the one or more parameters further comprises:
    determining a relative priority level between the one or more instances of the uplink semi-persistent scheduling resources and the one or more instances of the downlink semi-persistent scheduling resources; and
    modifying the one or more parameters so as to prioritize either the transmission of the uplink communications over the one or more instances of the uplink semi-persistent scheduling resources or the reception of the downlink communications over the one or more instances of the downlink semi-persistent scheduling resources based at least in part on the relative priority level.

3. The method of claim 1, wherein modifying the one or more parameters further comprises:
    modifying at least one of a modulation and coding scheme parameter or a rank parameter for either the transmission of the uplink communications over the one or more instances of the uplink semi-persistent scheduling resources or the reception of the downlink communications over the one or more instances of the downlink semi-persistent scheduling resources.

4. The method of claim 1, wherein modifying the one or more parameters further comprises:
    modifying at least one of an uplink transmit power parameter, a frequency hopping parameter, or a precoder parameter for the transmission of the uplink communications over the one or more instances of the uplink semi-persistent scheduling resources.

5. The method of claim 1, wherein applying the one or more parameters further comprises:
applying the one or more parameters, after modification, to communications during additional non-overlapping instances of the uplink semi-persistent scheduling resources and the downlink semi-persistent scheduling resources.

6. The method of claim 1, wherein applying the one or more parameters further comprises:
applying the one or more parameters, after modification, to communications during only the one or more instances of the uplink semi-persistent scheduling resources and the one or more instances of the downlink semi-persistent scheduling resources.

7. The method of claim 1, wherein receiving the one or more messages comprises:
receiving a first message for the uplink semi-persistent scheduling resources and a second message for the downlink semi-persistent scheduling resources.

8. The method of claim 1, wherein receiving the one or more messages comprises:
receiving a common message for the uplink semi-persistent scheduling resources and the downlink semi-persistent scheduling resources.

9. The method of claim 8, further comprising:
determining, based at least in part on the common message, a downlink bandwidth part identifier associated with the downlink semi-persistent scheduling resources; and
determining an uplink bandwidth part identifier associated with the uplink semi-persistent scheduling resources based at least in part on the downlink bandwidth part identifier.

10. The method of claim 8, further comprising:
determining, based at least in part on the common message, an uplink bandwidth part identifier associated with the uplink semi-persistent scheduling resources; and
determining a downlink bandwidth part identifier associated with the downlink semi-persistent scheduling resources based at least in part on the uplink bandwidth part identifier.

11. The method of claim 8, wherein receiving the common message further comprises:
receiving a common set of parameters for both the uplink semi-persistent scheduling resources and the downlink semi-persistent scheduling resources, separate sets of parameters for the uplink semi-persistent scheduling resources and the downlink semi-persistent scheduling resources, a first set of parameters for the downlink semi-persistent scheduling resources with a first offset for determination of the uplink semi-persistent scheduling resources, or a second set of parameters for the uplink semi-persistent scheduling resources with a second offset for determination of the downlink semi-persistent scheduling resources.

12. The method of claim 11, wherein the common set of parameters, the separate sets of parameters, the first set of parameters, and the second set of parameters each include one or more of time domain resource allocation parameters, frequency domain resource allocation parameters, modulation and coding scheme parameters, rank parameters, or periodicity parameters.

13. The method of claim 8, further comprising:
identifying an activation status of the downlink semi-persistent scheduling resources and the uplink semi-persistent scheduling resources, wherein the activation status is based on one of the downlink semi-persistent scheduling resources being activated by the common message while the uplink semi-persistent scheduling resources are dynamically activated, the uplink semi-persistent scheduling resources being activated by the common message while the downlink semi-persistent scheduling resources are dynamically activated, both the uplink semi-persistent scheduling resources and the downlink semi-persistent scheduling resources being activated by the common message, or both the uplink semi-persistent scheduling resources and the downlink semi-persistent scheduling resources being dynamically activated.

14. The method of claim 8, further comprising:
receiving downlink control information separately activating the uplink semi-persistent scheduling resources and the downlink semi-persistent scheduling resources.

15. The method of claim 8, further comprising:
receiving downlink control information activating the uplink semi-persistent scheduling resources; and
determining that the downlink semi-persistent scheduling resources are activated based at least in part on the downlink control information activating the uplink semi-persistent scheduling resources.

16. The method of claim 8, further comprising:
receiving downlink control information activating the downlink semi-persistent scheduling resources; and
determining that the uplink semi-persistent scheduling resources are activated based at least in part on the downlink control information activating the downlink semi-persistent scheduling resources.

17. The method of claim 8, further comprising:
transmitting a feedback message acknowledging receipt of downlink control information activating the uplink semi-persistent scheduling resources and the downlink semi-persistent scheduling resources, wherein the feedback message is at least one of a medium access control-control element (MAC-CE) or a hybrid automatic repeat request (HARQ) indicator.

18. The method of claim 8, further comprising:
receiving downlink control information deactivating the uplink semi-persistent scheduling resources; and
determining that the downlink semi-persistent scheduling resources are deactivated based at least in part on the downlink control information deactivating the uplink semi-persistent scheduling resources.

19. The method of claim 8, further comprising:
receiving downlink control information deactivating the downlink semi-persistent scheduling resources; and
determining that the uplink semi-persistent scheduling resources are deactivated based at least in part on the downlink control information deactivating the downlink semi-persistent scheduling resources.

20. The method of claim 8, further comprising:
receiving downlink control information that includes separate indications for deactivating the downlink semi-persistent scheduling resources and the uplink semi-persistent scheduling resources.

21. A method for wireless communication at a base station, comprising:
determining, for a user equipment (UE), one or more parameters associated with full duplex communications on uplink semi-persistent scheduling resources, downlink semi-persistent scheduling resources, or both, based at least in part on one or more instances of the uplink semi-persistent scheduling resources at least partially overlapping in time with one or more instances of the downlink semi-persistent scheduling resources;

transmitting one or more messages indicative of the uplink semi-persistent scheduling resources allocated to the UE and the downlink semi-persistent scheduling resources allocated to the UE, the uplink semi-persistent scheduling resources and the downlink semi-persistent scheduling resources being within a frequency band used for the full duplex communications with the UE; and applying the one or more parameters to reception of uplink communications over the one or more instances of the uplink semi-persistent scheduling resources, transmission of downlink communications over the one or more instances of the downlink semi-persistent scheduling resources, or both.

22. The method of claim 21, wherein determining the one or more parameters further comprises:

determining a relative priority level between the one or more instances of the uplink semi-persistent scheduling resources and the one or more instances of the downlink semi-persistent scheduling resources; and determining the one or more parameters so as to prioritize either the transmission of the uplink communications over the one or more instances of the uplink semi-persistent scheduling resources or the reception of the downlink communications over the one or more instances of the downlink semi-persistent scheduling resources based at least in part on the relative priority level.

23. The method of claim 21, wherein determining the one or more parameters further comprises:

determining at least one of a modulation and coding scheme parameter or a rank parameter for either the reception of the uplink communications over the one or more instances of the uplink semi-persistent scheduling resources or the transmission of the downlink communications over the one or more instances of the downlink semi-persistent scheduling resources.

24. The method of claim 21, wherein determining the one or more parameters further comprises:

determining at least one of an uplink transmit power parameter, a frequency hopping parameter, or a precoder parameter for the reception of the uplink communications over the one or more instances of the uplink semi-persistent scheduling resources.

25. The method of claim 21, wherein determining the one or more parameters further comprises:

applying the one or more parameters to communications during additional non-overlapping instances of the uplink semi-persistent scheduling resources and the downlink semi-persistent scheduling resources.

26. The method of claim 21, wherein determining the one or more parameters further comprises:

applying the one or more parameters to communications during only the one or more instances of the uplink semi-persistent scheduling resources and the one or more instances of the downlink semi-persistent scheduling resources.

27. The method of claim 21, wherein transmitting the one or more messages comprises:

transmitting a first message for the uplink semi-persistent scheduling resources and a second message for the downlink semi-persistent scheduling resources.

28. The method of claim 21, wherein transmitting the one or more messages comprises:

transmitting a common message for the uplink semi-persistent scheduling resources and the downlink semi-persistent scheduling resources.

29. An apparatus for wireless communication at a user equipment (UE), comprising:

a processor;

memory coupled with the processor; and instructions stored in the memory and executable by the processor to cause the apparatus to:

receive one or more messages indicative of uplink semi-persistent scheduling resources allocated to the UE and downlink semi-persistent scheduling resources allocated to the UE, the uplink semi-persistent scheduling resources and the downlink semi-persistent scheduling resources being within a frequency band used for full duplex communications by the UE;

modify one or more parameters associated with the full duplex communications on the uplink semi-persistent scheduling resources, the downlink semi-persistent scheduling resources, or both, based at least in part on one or more instances of the uplink semi-persistent scheduling resources at least partially overlapping in time with one or more instances of the downlink semi-persistent scheduling resources; and apply the one or more parameters, after modification, to transmission of uplink communications over the one or more instances of the uplink semi-persistent scheduling resources, reception of downlink communications over the one or more instances of the downlink semi-persistent scheduling resources, or both.

30. An apparatus for wireless communication at a base station, comprising:

a processor;

memory coupled with the processor; and instructions stored in the memory and executable by the processor to cause the apparatus to:

determine, for a user equipment (UE), one or more parameters associated with full duplex communications on uplink semi-persistent scheduling resources, downlink semi-persistent scheduling resources, or both, based at least in part on one or more instances of the uplink semi-persistent scheduling resources at least partially overlapping in time with one or more instances of the downlink semi-persistent scheduling resources;

transmit one or more messages indicative of the uplink semi-persistent scheduling resources allocated to the UE and the downlink semi-persistent scheduling resources allocated to the UE, the uplink semi-persistent scheduling resources and the downlink semi-persistent scheduling resources being within a frequency band used for the full duplex communications with the UE; and apply the one or more parameters to reception of uplink communications over the one or more instances of the uplink semi-persistent scheduling resources, transmission of downlink communications over the one or more instances of the downlink semi-persistent scheduling resources, or both.

* * * * *